(12) United States Patent
Nakatani et al.

(10) Patent No.: US 12,258,917 B2
(45) Date of Patent: Mar. 25, 2025

(54) ENGINE SYSTEM

(71) Applicant: KABUSHIKI KAISHA TOYOTA JIDOSHOKKI, Kariya (JP)

(72) Inventors: Norinosuke Nakatani, Kariya (JP); Hideaki Suzuki, Kariya (JP); Hiroyasu Kawauchi, Kariya (JP); Tadashi Takeuchi, Kariya (JP); Yoshitaka Takeuchi, Kariya (JP); Takayuki Homma, Kariya (JP); Shohei Matsumoto, Kariya (JP); Hidehito Kubo, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 18/722,131

(22) PCT Filed: Sep. 6, 2022

(86) PCT No.: PCT/JP2022/033460
§ 371 (c)(1),
(2) Date: Jun. 20, 2024

(87) PCT Pub. No.: WO2023/119743
PCT Pub. Date: Jun. 29, 2023

(65) Prior Publication Data
US 2025/0059927 A1    Feb. 20, 2025

(30) Foreign Application Priority Data
Dec. 22, 2021  (JP) .................................. 2021-208033

(51) Int. Cl.
*F02D 41/00* (2006.01)
*F02D 41/06* (2006.01)
(Continued)

(52) U.S. Cl.
CPC ....... *F02D 41/0027* (2013.01); *F02D 41/062* (2013.01); *F02M 21/0227* (2013.01);
(Continued)

(58) Field of Classification Search
CPC .......... F02D 41/0027; F02D 2200/023; F02M 21/06; F02M 21/0227
See application file for complete search history.

(56) References Cited

U.S. PATENT DOCUMENTS 8,370,049 B1 * 2/2013 Shimizu .............. F02D 19/0671
                                                      123/304
9,249,720 B2   2/2016 Miyagawa
(Continued)

FOREIGN PATENT DOCUMENTS

| JP | 2001-065335 A | 3/2001 |
| JP | 2014-211155 A | 11/2014 |
| JP | 2021-095323 A | 6/2021 |

OTHER PUBLICATIONS

International Search Report for PCT/JP2022/033460 dated Nov. 15, 2022.
(Continued)

*Primary Examiner* — Kevin A Lathers
(74) *Attorney, Agent, or Firm* — Sughrue Mion, PLLC

(57) ABSTRACT

An engine system includes: a combustor including an ignition unit configured to ignite the fuel gas and configured to generate combustion gas that heats a catalyst; an outside air temperature detection unit configured to detect an outside air temperature; a catalyst temperature detection unit configured to detect a temperature of the catalyst; an operating environment detection unit configured to detect an operating environment of the combustor; a combustion time determination unit configured to determine combustion time of the combustor; and a start control unit configured to, at a time of starting the engine, perform ON control on a starter and
(Continued)

the ignition unit and control a third fuel supply valve, a first flow rate control valve, and a second flow rate control valve to open, and thereafter when the combustion time elapses, perform OFF control on the ignition unit and control the third fuel supply valve to close.

8 Claims, 23 Drawing Sheets

(51) Int. Cl.
*F02M 21/02* (2006.01)
*F02M 21/06* (2006.01)

(52) U.S. Cl.
CPC ....... *F02M 21/06* (2013.01); *F02D 2200/023* (2013.01); *F02D 2200/70* (2013.01)

(56) References Cited

U.S. PATENT DOCUMENTS

| | | | | |
|---|---|---|---|---|
| 2003/0064259 | A1* | 4/2003 | Gittleman | C01B 3/32 429/410 |
| 2009/0000575 | A1* | 1/2009 | Shimada | B60L 50/61 123/3 |
| 2022/0388841 | A1 | 12/2022 | Kawauchi et al. | |

OTHER PUBLICATIONS

International Preliminary Report on Patentability dated Jun. 20, 2024 with a Translation of the Written Opinion of the International Searching Authority in Application No. PCT/JP2022/033460.

* cited by examiner

ENGINE SYSTEM

CROSS REFERENCE TO RELATED APPLICATIONS

This application is a National Stage of International Application No. PCT/JP2022/033460 filed Sep. 6, 2022, claiming priority based on Japanese Patent Application No. 2021-208033 filed Dec. 22, 2021.

TECHNICAL FIELD

The present disclosure relates to an engine system.

BACKGROUND ART

As a conventional engine system, for example, a technology described in Patent Literature 1 is known. An engine system described in Patent Literature 1 includes: an engine main body; an intake branch pipe connected to an intake port of each cylinder of the engine main body; an ammonia injection valve that injects ammonia toward each engine intake passage of the engine main body; a hydrogen generation device that generates hydrogen from liquid ammonia; and a hydrogen injection valve that injects hydrogen toward each engine intake passage of the engine main body. The hydrogen generation device includes: a tank in which liquid ammonia is stored; a vaporizer that heats and vaporizes liquid ammonia; a supply pipe through which part of gas ammonia generated by the vaporizer flows toward the ammonia injection valve; a decomposer that decomposes gas ammonia generated by the vaporizer; an inflow pipe through which air supplied to the decomposer flows; a supply pipe through which hydrogen generated by the decomposer flows toward the hydrogen injection valve; and an electric heater that heats a catalyst of the decomposer.

Patent Literature 2 describes a reforming system. The reforming system described in Patent Literature 2 includes: a reformer including a combustion catalyst and a reforming catalyst; a supply pipe connected to the reformer; a gas introduction unit that is provided on the supply pipe and introduces ammonia gas and air into the supply pipe; an ignition unit that ignites ammonia gas introduced into the supply pipe by the gas introduction unit; a temperature sensor that detects the temperature of the reformer; a first control unit that, at the time of start-up, supplies ammonia gas and air into the supply pipe and ignites the ignition unit; and a second control unit that, after control processing by the first control unit is executed, when the temperature of the reformer becomes equal to or higher than a specified temperature, stops the supply of ammonia gas and air into the supply pipe.

Patent Literature 3 describes a catalytic combustion apparatus. The catalytic combustion apparatus described in Patent Literature 3 includes: a combustion cylinder in which a catalytic combustion unit is incorporated; a main injector that injects liquid fuel into a mixing chamber of the combustion cylinder; a main air introduction port for supplying combustion air into the mixing chamber of the combustion cylinder; an auxiliary burner that, at the time of starting, preheats the catalytic combustion unit by combustion of fuel; a temperature sensor that detects the temperature of the outside of a vehicle compartment of an automobile or the temperature of the inside of the catalytic combustion apparatus; and a preheating time setting means that, at the time of starting, sets the preheating time of the auxiliary burner according to the outside air temperature or the internal temperature of the apparatus detected by the temperature sensor.

CITATION LIST

Patent Literature

Patent Literature 1: Japanese Patent Application Laid-Open No. 2014-211155
Patent Literature 2: Japanese Patent Application Laid-Open No. 2021-95323
Patent Literature 3: Japanese Patent Application Laid-Open No. 2001-65335

SUMMARY OF INVENTION

Technical Problem

However, the following problems exist in the case where, in an engine system like that of Patent Literature 1 above, the technologies described in Patent Literatures 2 and 3 are used to heat the catalyst of the reformer. That is, in feedback control using a detection value of a temperature sensor or the like as described in Patent Literature 2 above, the control response is not in time, and consequently the temperature of the catalyst may be excessively increased. Further, when only a measure of setting the combustion time of the combustor according to the outside air temperature or the internal temperature of the apparatus is taken as described in Patent Literature 3 above, an appropriate period of combustion time is not obtained depending on the operating environment of the combustor. Thus, an insufficient temperature increase of the catalyst may occur, and a desired amount of hydrogen may not be generated.

An object of the present disclosure is to provide an engine system capable of increasing the temperature of a catalyst of a reformer to an appropriate temperature regardless of the operating environment of a combustor.

Solution to Problem

An engine system according to an aspect of the present disclosure includes: an engine in which fuel gas combusts together with hydrogen; a starter configured to start the engine; an intake passage through which air supplied to the engine flows; an exhaust passage through which exhaust gas generated in the engine flows; a first flow rate control valve provided on the intake passage and configured to control the flow rate of air supplied to the engine; a first fuel supply valve configured to supply fuel gas to the engine; a reformer including a catalyst that decomposes fuel gas into hydrogen and configured to reform fuel gas to generate a reformed gas containing hydrogen; a first air flow path through which air supplied to the reformer flows; a second flow rate control valve provided on the first air flow path and configured to control the flow rate of air supplied to the reformer; a second fuel supply valve configured to supply fuel gas to the reformer; a reformed gas flow path through which the reformed gas generated by the reformer flows toward the engine; a combustor including an ignition unit and configured to generate combustion gas that heats the catalyst, the ignition unit being configured to ignite fuel gas; a second air flow path through which air supplied to the combustor flows; a third fuel supply valve configured to supply fuel gas to the combustor; an outside air temperature detection unit configured to detect the outside air temperature; a catalyst temperature detection unit configured to detect the temperature of the catalyst; an operating environment detection unit configured to detect the operating environment of the combustor; a combustion time determination unit configured to determine the combustion time of the combustor based on the outside air temperature detected by the outside air temperature detection unit, the temperature of the catalyst detected by the catalyst temperature detection unit, and the operating environment of the combustor detected by the operating environment detection unit; and a start control unit configured to, at the time of starting the engine, perform ON control on the starter and the ignition unit and control the first fuel supply valve, the second fuel supply valve, the third fuel supply valve, the first flow rate control valve, and the second flow rate control valve to open and, thereafter when the combustion time determined by the combustion time determination unit elapses, perform OFF control on the ignition unit and control the third fuel supply valve to close.

In such an engine system, at the time of starting the engine, the starter and the ignition unit of the combustor are turned on, and fuel gas and air are supplied to the combustor; thereby, the fuel gas is ignited and combusted in the combustor, and combustion gas is generated. Then, the catalyst of the reformer is heated by the combustion gas, and fuel gas and air are supplied to the reformer; thereby, a reformed gas containing hydrogen is generated in the reformer, and the reformed gas flows through the reformed gas flow path and is supplied to the engine. Fuel gas and air are supplied to the engine, and thereby the fuel gas is mixed with hydrogen and combusted in the engine. Here, the outside air temperature, the temperature of the catalyst, and the operating environment of the combustor are detected. Then, the combustion time of the combustor is determined based on the outside air temperature, the temperature of the catalyst, and the operating environment of the combustor. When the combustion time elapses from the beginning of starting the engine, the ignition unit of the combustor is turned off, and the supply of fuel gas to the combustor is stopped. By thus detecting the operating environment of the combustor in addition to the outside air temperature and the temperature of the catalyst, an appropriate period of combustion time according to the operating environment of the combustor is obtained, and therefore an excessive temperature increase and an insufficient temperature increase of the catalyst of the reformer are prevented. Thereby, the temperature of the catalyst of the reformer is increased to an appropriate temperature regardless of the operating environment of the combustor.

The combustion time determination unit may determine the combustion time by setting a first period of time according to the outside air temperature, a second period of time according to the temperature of the catalyst, and a third period of time according to the operating environment of the combustor, and by adding the first period of time, the second period of time, and the third period of time to a reference period of time determined in advance. In such a configuration, an appropriate period of combustion time considering the outside air temperature, the temperature of the catalyst, and the operating environment of the combustor is easily obtained by simple calculation processing.

The operating environment of the combustor may be a quantity of state regarding the concentration of oxygen contained in the air or the flow rate of at least one of fuel gas and air supplied to the combustor. When the flow rates of fuel gas and air supplied to the combustor and the concentration of oxygen contained in the air change, the time required to heat the catalyst of the reformer changes. Thus, by detecting a quantity of state regarding the flow rate of at least one of fuel gas and air supplied to the combustor or the concentration of oxygen contained in the air, an appropriate period of combustion time according to the operating environment of the combustor is obtained.

The engine system may further include a battery configured to supply power to the starter, and the operating environment detection unit may detect the voltage of the battery as a quantity of state regarding the concentration of oxygen contained in the air or the flow rate of at least one of fuel gas and air supplied to the combustor. When the voltage of the battery decreases, the rotation rate of the starter decreases, and accordingly the rotation rate of the engine decreases. Therefore, the total flow rate of fuel gas and air supplied to the combustor decreases, and the amount of heat given from the combustor to the reformer decreases; accordingly, the heating of the catalyst of the reformer becomes slower. Thus, by detecting the voltage of the battery and determining the combustion time of the combustor while considering the voltage of the battery, an appropriate period of combustion time is obtained even when the voltage of the battery changes.

The engine system may further include a vaporizer configured to vaporize liquid fuel to generate fuel gas, and the operating environment detection unit may detect the temperature of the vaporizer or the pressure of fuel gas generated by the vaporizer as a quantity of state regarding the concentration of oxygen contained in the air or the flow rate of at least one of fuel gas and air supplied to the combustor. When the temperature of the vaporizer increases, the pressure of fuel gas generated by the vaporizer increases, and accordingly the flow rate of fuel gas supplied to the combustor increases. Therefore, the temperature of combustion gas decreases, and accordingly the heating of the catalyst of the reformer becomes slower. Thus, by detecting the temperature of the vaporizer or the pressure of fuel gas generated by the vaporizer and determining the combustion time of the combustor while considering the temperature of the vaporizer or the pressure of fuel gas, an appropriate period of combustion time is obtained even when the temperature of the vaporizer or the pressure of fuel gas changes.

The operating environment detection unit may detect the pressure of air flowing through the second air flow path as a quantity of state regarding the concentration of oxygen contained in the air or the flow rate of at least one of fuel gas and air supplied to the combustor. When the pressure of air flowing through the second air flow path becomes lower than atmospheric pressure, the concentration of oxygen contained in the air supplied to the combustor decreases, and accordingly the fuel gas is less likely to be combusted. Thus, by detecting the pressure of air flowing through the second air flow path and determining the combustion time of the combustor while considering the pressure of air, an appropriate period of combustion time is obtained even when the pressure of air supplied to the combustor changes.

The operating environment of the combustor may be a quantity of state regarding the amount of hydrogen generated that is required of the reformer. When the amount of hydrogen generated that is required of the reformer changes, the time required to heat the catalyst of the reformer changes. Thus, by detecting a quantity of state regarding the amount of hydrogen generated that is required of the reformer, an appropriate period of combustion time according to the operating environment of the combustor is obtained.

The operating environment detection unit may detect the temperature of cooling water for cooling the engine or the temperature of engine oil in the engine as a quantity of state regarding the amount of hydrogen generated that is required of the reformer. When the engine is in a warming-up state higher temperature than the state at the time of the cold start, the amount of hydrogen generated that is required of the reformer can be less than at the time of the cold start. Thus, by detecting the temperature of cooling water for cooling the engine or the temperature of engine oil in the engine, an appropriate period of combustion time is obtained even when the warming-up state of the engine changes.

Advantageous Effects of Invention

According to the present disclosure, the temperature of a catalyst of a reformer can be increased to an appropriate temperature regardless of the operating environment of a combustor.

DESCRIPTION OF EMBODIMENTS

Figure 1:
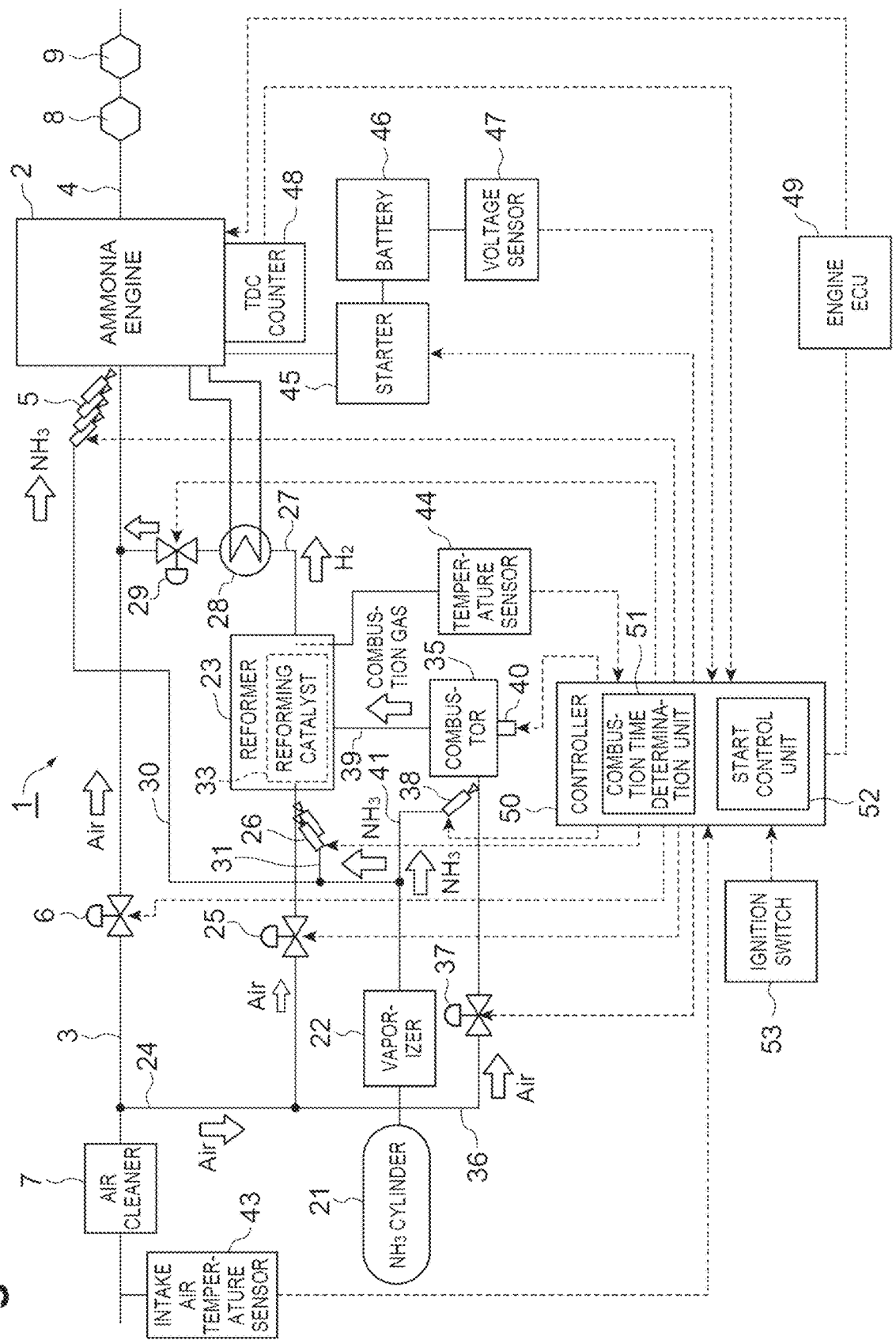
FIG. 1 is a schematic configuration diagram showing an engine system according to a first embodiment of the present disclosure.

Hereinbelow, embodiments of the present disclosure are described in detail with reference to the drawings. In the drawings, the same or equivalent elements are marked with the same reference numerals, and a repeated description is omitted.

FIG. 1 is a schematic configuration diagram showing an engine system according to a first embodiment of the present disclosure. In FIG. 1, an engine system 1 of the present embodiment is mounted on a vehicle (not illustrated). The engine system 1 includes an ammonia engine 2, an intake passage 3, an exhaust passage 4, a main injector 5, and a main throttle valve 6.

The ammonia engine 2 is an engine that uses ammonia gas ($NH_3$ gas) as fuel gas. In the ammonia engine 2, hydrogen ($H_2$) as a combustion aid is mixed with ammonia gas in order to easily combust flame-retardant ammonia gas. Herein, the ammonia engine 2 is a four-cylinder engine.

Figure 2:
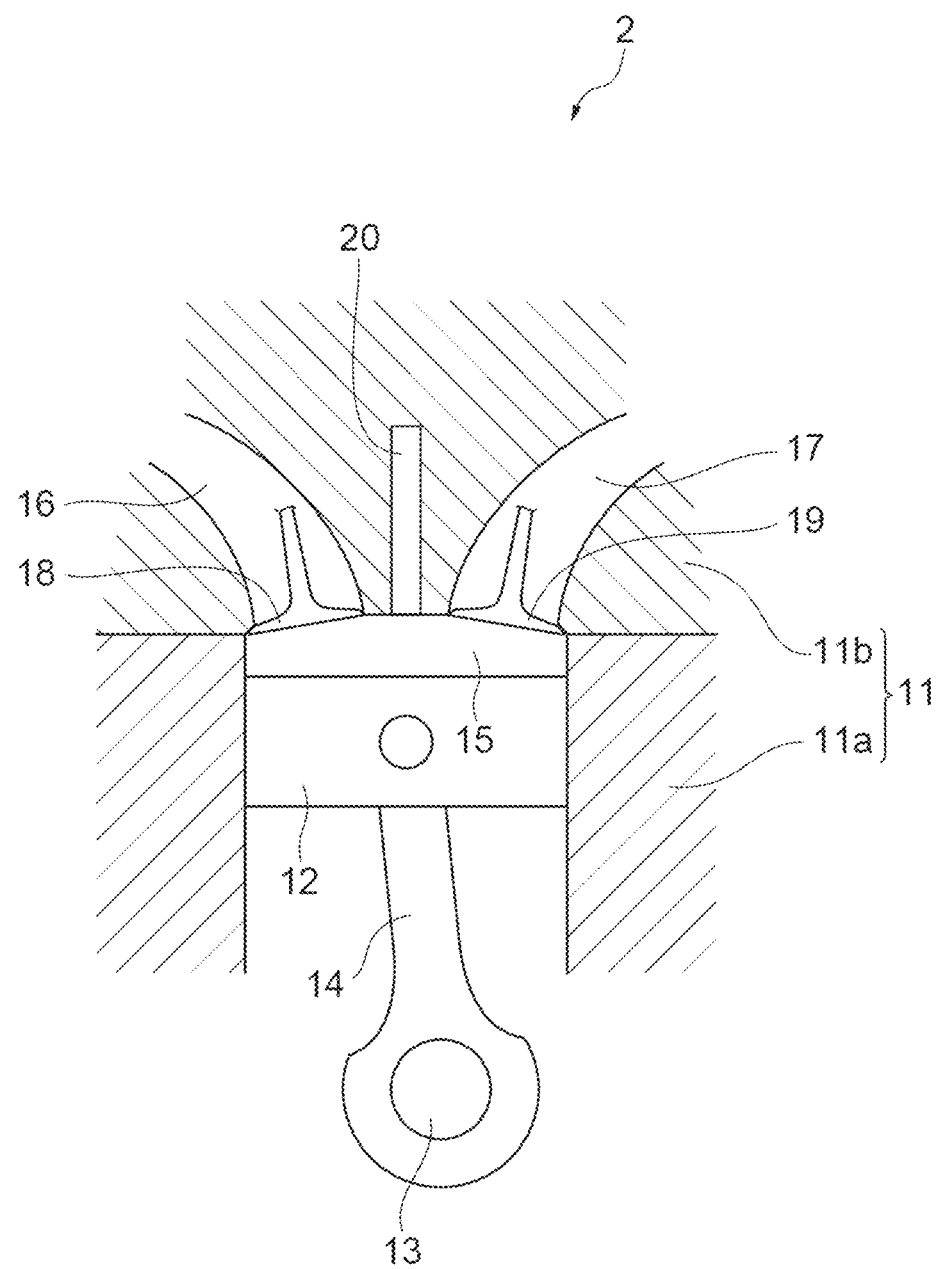
FIG. 2 is a cross-sectional view of an ammonia engine shown in FIG. 1.

As shown in FIG. 2, the ammonia engine 2 includes a cylinder 11, a piston 12 placed in the cylinder 11 in a reciprocally movable manner, and a connecting rod 14 connecting the piston 12 and a crankshaft 13.

The cylinder 11 is composed of a cylinder block 11a and a cylinder head 11b placed above the cylinder block 11a. The space defined by the cylinder block 11a, the cylinder head 11b, and the piston 12 forms a combustion chamber 15 in which ammonia gas combusts together with hydrogen to generate exhaust gas.

The cylinder head 11b is provided with an intake port 16 and an exhaust port 17 communicating with the combustion chamber 15. The intake port 16 is opened and closed by an intake valve 18. The exhaust port 17 is opened and closed by an exhaust valve 19. An ignition plug 20 is attached to the cylinder head 11b. The ignition plug 20 ignites a mixed gas of ammonia gas and air to ignite the ammonia gas.

The intake passage 3 is connected to the intake port 16 of the ammonia engine 2. The intake passage 3 is a passage through which air supplied to the combustion chamber 15 of the ammonia engine 2 flows. An air cleaner 7 that removes foreign matters such as dust and dirt contained in air is provided on the intake passage 3.

The exhaust passage 4 is connected to the exhaust port 17 of the ammonia engine 2. The exhaust passage 4 is a passage through which exhaust gas generated in the combustion chamber 15 of the ammonia engine 2 flows. A three-way catalyst 8 capable of purifying carbon monoxide (CO), hydrocarbons (HC), and nitrogen oxides (NOx) and an SCR catalyst 9 for removing NOx contained in exhaust gas are provided on the exhaust passage 4. In the engine system 1, in which ammonia gas is used as fuel, the three-way catalyst 8 can turn uncombusted ammonia contained in exhaust gas into clean substances.

The main injector 5 is an electromagnetic fuel injection valve that injects ammonia gas toward the combustion chamber 15 of the ammonia engine 2. The main injector 5 forms a first fuel supply valve that supplies ammonia gas to the ammonia engine 2.

The main throttle valve 6 is provided on the intake passage 3. The main throttle valve 6 is an electromagnetic first flow rate control valve that controls the flow rate of air supplied to the ammonia engine 2.

The engine system 1 further includes an ammonia cylinder 21, a vaporizer 22, a reformer 23, an air flow path 24, a reforming throttle valve 25, a reforming injector 26, a reformed gas flow path 27, a cooler 28, and a flow rate regulating valve 29.

The ammonia cylinder 21 is a container that stores ammonia in a liquid state. That is, the ammonia cylinder 21 stores liquid ammonia.

The vaporizer 22 vaporizes liquid ammonia stored in the ammonia cylinder 21 to generate ammonia gas. The ammonia gas generated by the vaporizer 22 flows through an ammonia flow path 30 and is supplied to the main injector 5, and furthermore flows through an ammonia flow path 31 and is supplied to the reforming injector 26.

The reformer 23 reforms ammonia gas by using heat generated by combusting ammonia gas, and thereby generates a reformed gas containing hydrogen. The reformer 23 includes a reforming catalyst 33. The reforming catalyst 33 is placed in a housing (not illustrated) of the reformer 23.

The reforming catalyst 33 has, for example, a honeycomb structure. The reforming catalyst 33 is a catalyst for combusting ammonia gas and decomposing ammonia gas into hydrogen. The reforming catalyst 33 is, for example, an ATR (autothermal reformer) type ammonia reforming catalyst. As the reforming catalyst 33, for example, a cobalt-based catalyst, a rhodium-based catalyst, a ruthenium-based catalyst, a palladium-based catalyst, or the like is used.

The air flow path 24 connects the intake passage 3 and the reformer 23. One end of the air flow path 24 is connected to a portion of the intake passage 3 between the air cleaner 7 and the main throttle valve 6. The other end of the air flow path 24 is connected to an inlet of the reformer 23. The air flow path 24 is a first air flow path through which air supplied to the reformer 23 flows.

The reforming throttle valve 25 is provided on the air flow path 24. The reforming throttle valve 25 is an electromagnetic second flow rate control valve that controls the flow rate of air supplied to the reformer 23.

The reforming injector 26 is an electromagnetic fuel injection valve that injects ammonia gas to the air flow path 24. The reforming injector 26 injects ammonia gas to a portion of the air flow path 24 between the reforming throttle valve 25 and the reformer 23. The reforming injector 26 forms a second fuel supply valve that supplies ammonia gas to the reformer 23.

The reformed gas flow path 27 connects the reformer 23 and the intake passage 3. One end of the reformed gas flow path 27 is connected to an outlet of the reformer 23. The other end of the reformed gas flow path 27 is connected to a portion of the intake passage 3 between the main throttle valve 6 and the ammonia engine 2. The reformed gas flow path 27 is a flow path through which the reformed gas generated by the reformer 23 flows toward the ammonia engine 2.

The cooler 28 is provided on the reformed gas flow path 27. Using engine cooling water for cooling the ammonia engine 2, the cooler 28 performs heat exchange on the reformed gas flowing through the reformed gas flow path 27, and cools the reformed gas.

The flow rate regulating valve 29 is provided on a portion of the reformed gas flow path 27 on the downstream side of the cooler 28. The flow rate regulating valve 29 is an electromagnetic valve that regulates the flow rate of the reformed gas supplied to the ammonia engine 2. An electromagnetic opening/closing valve (ON/OFF valve) may be used in place of the flow rate regulating valve 29.

The engine system 1 further includes a combustor 35, an air flow path 36, a combustion throttle valve 37, and a combustion injector 38.

The combustor 35 is connected to the reformer 23 via a supply pipe 39. The combustor 35 generates combustion gas for heating the reforming catalyst 33 of the reformer 23. The combustor 35 is, for example, a tubular flame burner that, in its cylindrical housing, ignites and combusts ammonia gas in a swirl flow state. The combustor 35 includes an ignition plug 40. The ignition plug 40 is an ignition unit that ignites a mixed gas of ammonia gas and air to ignite the ammonia gas.

The air flow path 36 connects the air flow path 24 and the combustor 35. One end of the air flow path 36 is connected in a branched manner to a portion of the air flow path 24 on the upstream side of the reforming throttle valve 25. The other end of the air flow path 36 is connected to the housing of the combustor 35. The air flow path 36 is a second air flow path through which air supplied to the combustor 35 flows.

The combustion throttle valve 37 is placed on the air flow path 36. The combustion throttle valve 37 is an electromagnetic third flow rate control valve that controls the flow rate of air supplied to the combustor 35.

The combustion injector 38 is connected to the vaporizer 22 via an ammonia flow path 41. The combustion injector 38 is an electromagnetic fuel injection valve that injects ammonia gas to the air flow path 36. The combustion injector 38 injects ammonia gas to a portion of the air flow path 36 between the combustion throttle valve 37 and the combustor 35. The combustion injector 38 forms a third fuel supply valve that supplies ammonia gas to the combustor 35.

The engine system 1 further includes an intake air temperature sensor 43, a temperature sensor 44, a starter 45, a battery 46, a voltage sensor 47, and a TDC counter 48.

The intake air temperature sensor 43 detects, as the outside air temperature, the temperature of air flowing through the intake passage 3. The intake air temperature sensor 43 is an outside air temperature detection unit that detects the outside air temperature.

The temperature sensor 44 is a catalyst temperature detection unit that detects the temperature of the reforming catalyst 33 of the reformer 23. Herein, the temperature sensor 44 detects the temperature of a space on the downstream side of the reforming catalyst 33 in the housing of the reformer 23.

The temperature sensor 44 may directly detect the temperature of the reforming catalyst 33, or may detect the temperature of a space on the upstream side of the reforming catalyst 33 in the housing of the reformer 23. Alternatively, the temperature of the reforming catalyst 33 may be detected by using the temperature sensor 44 to detect the temperature of the inner wall or the temperature of the surface of the housing of the reformer 23.

The starter 45 starts the ammonia engine 2. Although not particularly illustrated, the starter 45 includes a starter motor, a plurality of gears, etc. The battery 46 supplies power to the starter 45.

The voltage sensor 47 is a sensor that detects the voltage of the battery 46. The voltage sensor 47 forms an operating environment detection unit that detects the operating environment of the combustor 35. When the voltage of the battery 46 changes, the rotation rate of the starter 45 changes, and the rotation rate of the ammonia engine 2 changes; accordingly, the total flow rate of ammonia gas and air supplied to the combustor 35 changes. Therefore, the voltage of the battery 46 corresponds to, as the operating environment of the combustor 35, a quantity of state regarding the flow rates of ammonia gas and air supplied to the combustor 35.

The TDC counter 48 counts the number of times the piston 12 (see FIG. 2) of the ammonia engine 2 has reached the top dead center (TDC). At the time of starting the ammonia engine 2, the rotation rate of the ammonia engine 2 is constant, and accordingly the cycle (time) at which the piston 12 reaches the top dead center is constant.

The engine system 1 further includes an engine ECU 49 and a controller 50. Each of the engine ECU 49 and the controller 50 is composed of a CPU, a RAM, a ROM, an input/output interface, etc.

The engine ECU 49 is an ECU (electronic control unit) that controls the ammonia engine 2. Specifically, the engine ECU 49 controls the intake valve 18, the exhaust valve 19, and the ignition plug 20 (see FIG. 2) of the ammonia engine 2 so that four strokes of an intake stroke, a compression stroke, an expansion stroke (combustion stroke), and an exhaust stroke constitute one cycle. The engine ECU 49 controls the intake valve 18 in the intake stroke to open. The engine ECU 49 performs ON control on the ignition plug 20 in the expansion stroke. The engine ECU 49 controls the exhaust valve 19 in the exhaust stroke to open.

The controller 50 includes a combustion time determination unit 51 and a start control unit 52. The combustion time determination unit 51 determines the combustion time of the combustor 35 based on the outside air temperature detected by the intake air temperature sensor 43, the temperature of the reforming catalyst 33 detected by the temperature sensor 44, and the voltage of the battery 46 detected by the voltage sensor 47.

At the time of starting the ammonia engine 2, the start control unit 52 performs ON control on the starter 45 and the ignition plug 40 of the combustor 35, and controls the main injector 5, the main throttle valve 6, the reforming throttle valve 25, the reforming injector 26, the flow rate regulating valve 29, the combustion throttle valve 37, and the combustion injector 38 to open.

When the combustion time determined by the combustion time determination unit 51 elapses from the beginning of starting the ammonia engine 2, the start control unit 52 performs OFF control on the ignition plug 40 of the combustor 35, and controls the combustion throttle valve 37 and the combustion injector 38 to close.

Figure 3:
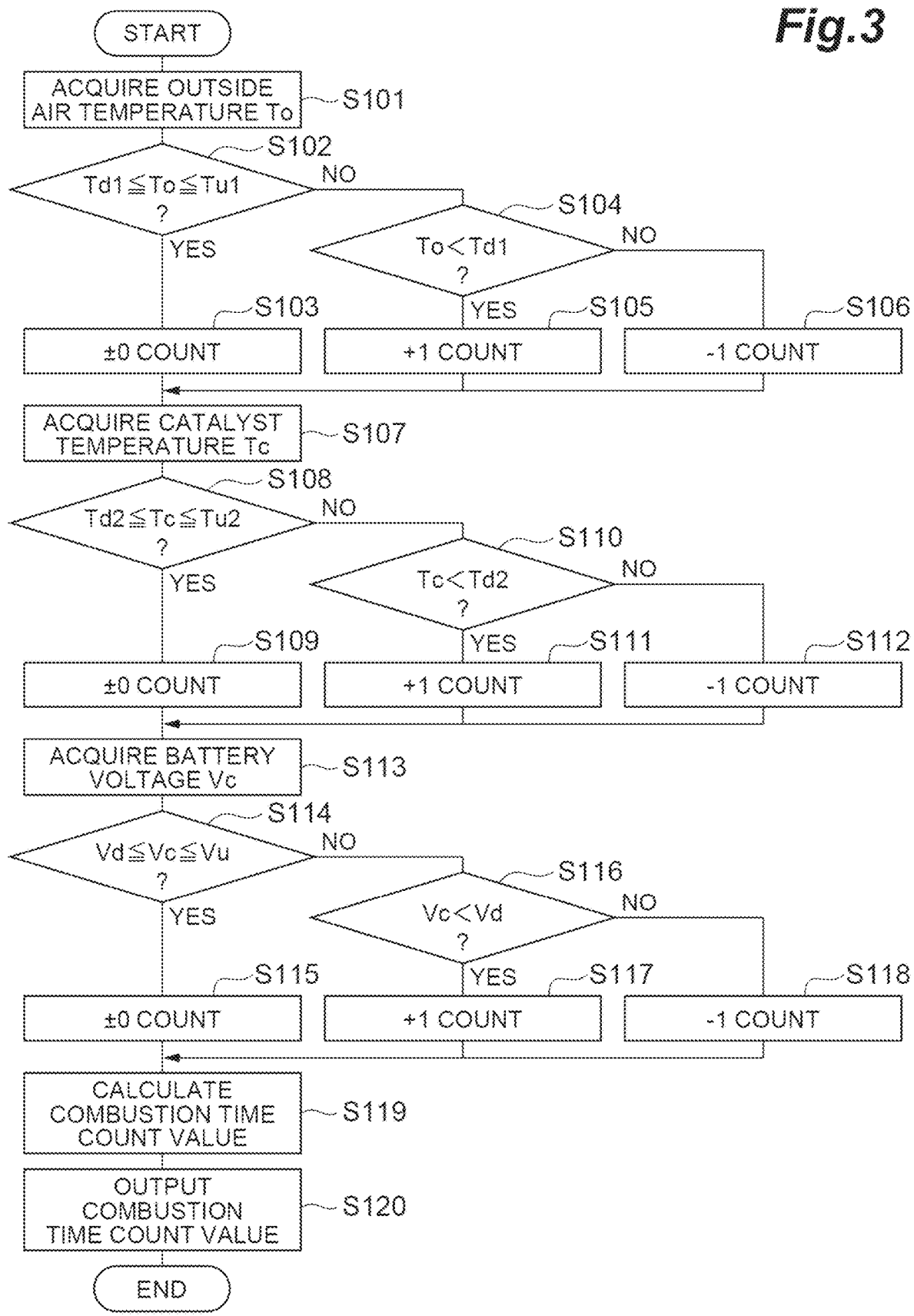
FIG. 3 is a flowchart showing a procedure of combustion time determination processing executed by a combustion time determination unit shown in FIG. 1.

FIG. 3 is a flowchart showing a procedure of combustion time determination processing executed by the combustion time determination unit 51. The present processing is executed when an ignition switch 53 (see FIG. 1) is operated to ON.

In the present processing, a reference TDC count value x is set in advance. The reference TDC count value x is a count value of the TDC counter 48 corresponding to a reference period of time of combustion by the combustor 35. The reference TDC count value x is such a value that the reforming catalyst 33 of the reformer 23 reaches the reaction temperature in the normal state. The reaction temperature is a temperature at which the reforming catalyst 33 can perform reforming.

In FIG. 3, the combustion time determination unit 51 first acquires the outside air temperature To detected by the intake air temperature sensor 43 (step S101). Then, the combustion time determination unit 51 determines whether or not the outside air temperature To is equal to or higher than threshold Td1 and equal to or lower than threshold Tu1 (step S102). Threshold Td1 is, for example, 10° C. Threshold Tu1 is, for example, 50° C.

When the combustion time determination unit 51 determines that the condition that the outside air temperature To be equal to or higher than threshold Td1 and equal to or lower than threshold Tu1 is satisfied, the combustion time determination unit 51 sets an addition count value C1 to the +0 count (step S103). The addition count value C1 corresponds to a first period of time according to the outside air temperature To. When the addition count value C1 is the +0 count, for example, the first period of time is 0 seconds.

When the combustion time determination unit 51 determines that the condition that the outside air temperature To be equal to or higher than threshold Td1 and equal to or lower than threshold Tu1 is not satisfied, the combustion time determination unit 51 determines whether or not the outside air temperature To is lower than threshold Td1 (step S104). When the combustion time determination unit 51 determines that the outside air temperature To is lower than threshold Td1, the combustion time determination unit 51 sets the addition count value C1 to the +1 count (step S105). When the addition count value C1 is the +1 count, for example, the first period of time is +0.1 seconds.

When the combustion time determination unit 51 determines that the outside air temperature To is not lower than threshold Td1, that is, the outside air temperature To is higher than threshold Tu1, the combustion time determination unit 51 sets the addition count value C1 to the −1 count (step S106). When the addition count value C1 is the −1 count, for example, the first period of time is -0.1 seconds.

After executing any of steps S103, S105, and S106, the combustion time determination unit 51 acquires the temperature Tc of the reforming catalyst 33 detected by the temperature sensor 44 (step S107). Then, the combustion time determination unit 51 determines whether or not the temperature Tc of the reforming catalyst 33 is equal to or higher than threshold Td2 and equal to or lower than threshold Tu2 (step S108). Threshold Td2 is, for example, 10° C. Threshold Tu2 is, for example, 100° C.

When the combustion time determination unit 51 determines that the condition that the temperature Tc of the reforming catalyst 33 be equal to or higher than threshold Td2 and equal to or lower than threshold Tu2 is satisfied, the combustion time determination unit 51 sets an addition count value C2 to the +0 count (step S109). The addition count value C2 corresponds to a second period of time according to the temperature Tc of the reforming catalyst 33. When the addition count value C2 is the +0 count, for example, the second period of time is 0 seconds.

When the combustion time determination unit 51 determines that the condition that the temperature Tc of the reforming catalyst 33 be equal to or higher than threshold Td2 and equal to or lower than threshold Tu2 is not satisfied, the combustion time determination unit 51 determines whether or not the temperature Tc of the reforming catalyst 33 is lower than threshold Td2 (step S110). When the combustion time determination unit 51 determines that the temperature Tc of the reforming catalyst 33 is lower than threshold Td2, the combustion time determination unit 51 sets the addition count value C2 to the +1 count (step S111). When the addition count value C2 is the +1 count, for example, the second period of time is +0.1 seconds.

When the combustion time determination unit 51 determines that the temperature Tc of the reforming catalyst 33 is not lower than threshold Td2, that is, the temperature Tc of the reforming catalyst 33 is higher than threshold Tu2, the combustion time determination unit 51 sets the addition count value C2 to the −1 count (step S112). When the addition count value C2 is the −1 count, for example, the second period of time is-0.1 seconds.

After executing any of steps S109, S111, and S112, the combustion time determination unit 51 acquires the voltage Vc of the battery 46 detected by the voltage sensor 47 (step S113). Then, the combustion time determination unit 51 determines whether or not the voltage Vc of the battery 46 is equal to or higher than threshold Vd and equal to or lower than threshold Vu (step S114). Threshold Vd is, for example, 9 V. Threshold Vu is, for example, 12 V.

When the combustion time determination unit 51 determines that the condition that the voltage Vc of the battery 46 be equal to or higher than threshold Vd and equal to or lower than threshold Vu is satisfied, the combustion time determination unit 51 sets an addition count value C3 to the +0 count (step S115). The addition count value C3 corresponds to a third period of time according to the voltage Vc of the battery 46. When the addition count value C3 is the +0 count, for example, the third period of time is 0 seconds.

When the combustion time determination unit 51 determines that the condition that the voltage Vc of the battery 46 be equal to or higher than threshold Vd and equal to or lower than threshold Vu is not satisfied, the combustion time determination unit 51 determines whether or not the voltage Vc of the battery 46 is lower than threshold Vd (step S116). When the combustion time determination unit 51 determines that the voltage Vc of the battery 46 is lower than threshold Vd, the combustion time determination unit 51 sets the addition count value C3 to the +1 count (step S117). When the addition count value C3 is the +1 count, for example, the third period of time is +0.1 seconds.

When the combustion time determination unit 51 determines that the voltage Vc of the battery 46 is not lower than threshold Vd, that is, the voltage Vc of the battery 46 is higher than threshold Vu, the combustion time determination unit 51 sets the addition count value C3 to the −1 count (step S118). When the addition count value C3 is the −1 count, for example, the third period of time is −0.1 seconds.

After executing any of steps S115, S117, and S118, the combustion time determination unit 51 adds the addition count values C1 to C3 to the reference TDC count value x, and thereby calculates a combustion time count value (step S119). The combustion time count value corresponds to the combustion time of the combustor 35. Then, the combustion time determination unit 51 outputs the combustion time count value to the start control unit 52 (step S120).

Although in the present processing each of the addition count values C1 to C3 is set to the +0 count, the +1 count, or the −1 count according to conditions, the addition count values C1 to C3 are not particularly limited thereto.

Figure 4:
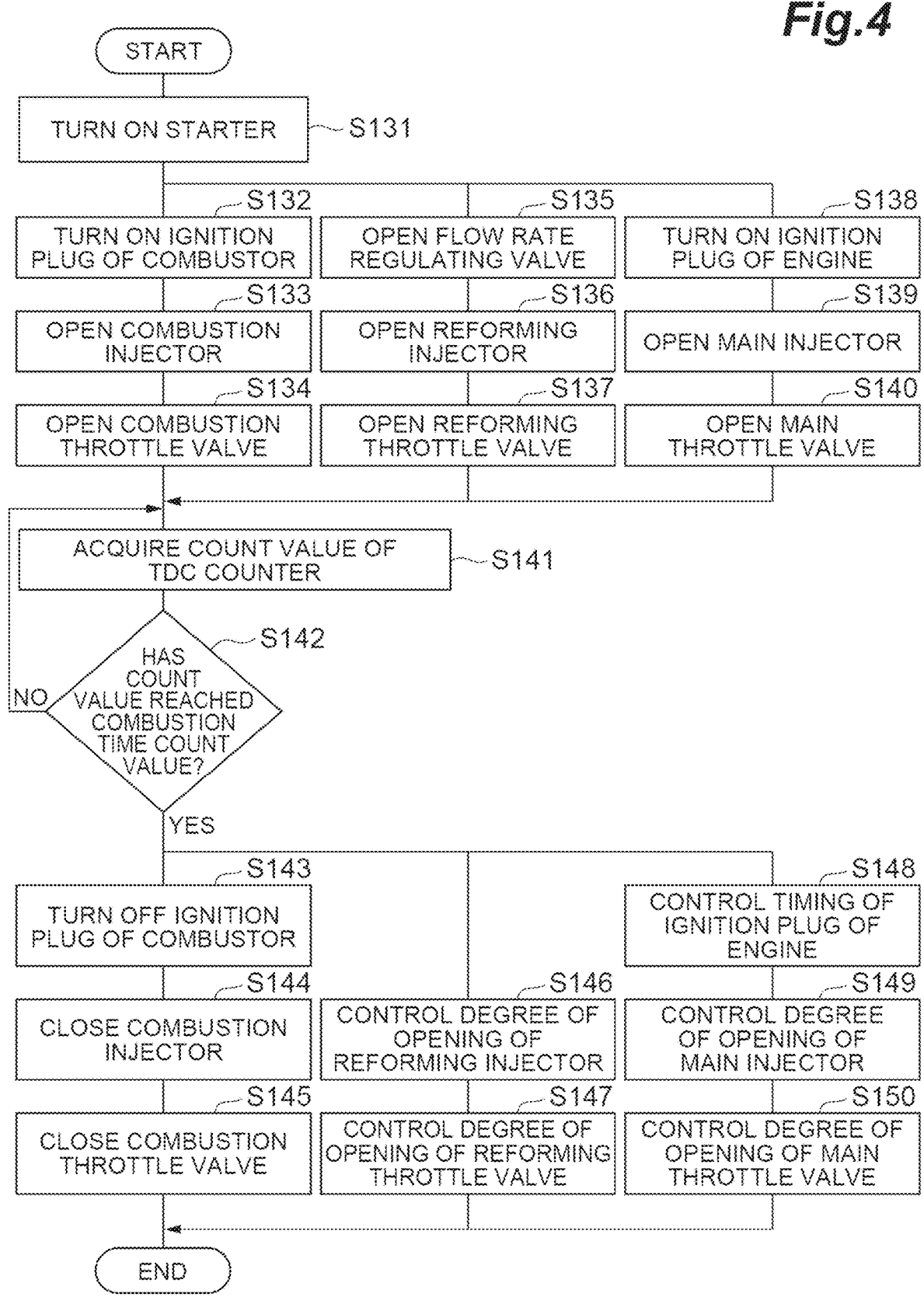
FIG. 4 is a flowchart showing a procedure of start control processing executed by a start control unit shown in FIG. 1.

FIG. 4 is a flowchart showing a procedure of start control processing executed by the start control unit 52. Also, the present processing is executed when the ignition switch 53 is operated to ON.

In FIG. 4, the start control unit 52 first performs ON control on the starter 45 (step S131). Thereby, the ammonia engine 2 is cranked.

Subsequently, the start control unit 52 performs ON control on the ignition plug 40 of the combustor 35 (step S132). Then, the start control unit 52 controls the combustion injector 38 to open (step S133). Then, the start control unit 52 controls the combustion throttle valve 37 to open (step S134). Thereby, ammonia gas and air are supplied to the combustor 35, and the ammonia gas is ignited and combusted in the combustor 35 to generate combustion gas. Then, the reformer 23 is heated by the combustion gas.

The start control unit 52 may execute steps S132 to S134 in an order different from the above order, or may simultaneously execute steps S132 to S134.

After executing step S131 above, the start control unit 52 controls the flow rate regulating valve 29 to open (step S135). Then, the start control unit 52 controls the reforming injector 26 to open (step S136). Then, the start control unit 52 controls the reforming throttle valve 25 to open (step S137). Thereby, ammonia gas and air are supplied to the reformer 23.

The start control unit 52 may execute steps S135 to S137 in an order different from the above order, or may simultaneously execute steps S135 to S137.

After executing step S131 above, the start control unit 52 outputs, to the engine ECU 49, a control signal for turning on the ignition plug 20 of the ammonia engine 2 (step S138). Then, the start control unit 52 controls the main injector 5 to open (step S139). Then, the start control unit 52 controls the main throttle valve 6 to open (step S140). Thereby, ammonia gas and air are supplied to the ammonia engine 2.

The start control unit 52 may execute steps S138 to S140 in an order different from the above order, or may simultaneously execute steps S138 to S140.

After executing steps S132 to S140 above, the start control unit 52 acquires the count value of the TDC counter 48 (step S141). Then, the start control unit 52 determines whether or not the count value of the TDC counter 48 from when the starter 45 is controlled to ON has reached the combustion time count value determined by the combustion time determination unit 51 (step S142). That is, the start control unit 52 determines whether or not the combustion time determined by the combustion time determination unit 51 has elapsed. When the start control unit 52 determines that the count value of the TDC counter 48 has not reached the combustion time count value, the start control unit 52 executes step S141 again.

When the start control unit 52 determines that the count value of the TDC counter 48 has reached the combustion time count value, the start control unit 52 performs OFF control on the ignition plug 40 of the combustor 35 (step S143). Then, the start control unit 52 controls the combustion injector 38 to close (step S144). Then, the start control unit 52 controls the combustion throttle valve 37 to close (step S145). Thereby, the supply of ammonia gas and air to the combustor 35 is stopped, and the combustion of ammonia gas by the combustor 35 ends.

The start control unit 52 may execute steps S143 to S145 in an order different from the above order, or may simultaneously execute steps S143 to S145.

When the start control unit 52 determines in step S142 that the count value of the TDC counter 48 has reached the combustion time count value, the start control unit 52 controls the degree of opening of the reforming injector 26 (step S146). Then, the start control unit 52 controls the degree of opening of the reforming throttle valve 25 (step S147). At this time, the start control unit 52 controls the degrees of opening of the reforming injector 26 and the reforming throttle valve 25 so that the air-fuel ratio becomes an air-fuel ratio suitable for the reforming operation by the reformer 23.

The start control unit 52 may execute steps S146 and S147 in an order different from the above order, or may simultaneously execute steps S146 and S147.

When the start control unit 52 determines in step S142 that the count value of the TDC counter 48 has reached the combustion time count value, the start control unit 52 outputs, to the engine ECU 49, a control signal for changing the ignition timing of the ignition plug 20 of the ammonia engine 2 (step S148). Then, the start control unit 52 controls the degree of opening of the main injector 5 (step S149). Then, the start control unit 52 controls the degree of opening of the main throttle valve 6 (step S150). At this time, the start control unit 52 controls the degrees of opening of the main injector 5 and the main throttle valve 6 so that the air-fuel ratio becomes an air-fuel ratio suitable for the state of the ammonia engine 2.

The start control unit 52 may execute steps S148 to S150 in an order different from the above order, or may simultaneously execute steps S148 to S150.

In the engine system 1 described above, when the ignition switch 53 of the vehicle is operated to ON, the starter 45 is turned on, and thereby the ammonia engine 2 is cranked. Further, the ignition plug 40 of the combustor 35 is turned on, and the combustion injector 38, the combustion throttle valve 37, the flow rate regulating valve 29, the reforming injector 26, the reforming throttle valve 25, the main injector 5, and the main throttle valve 6 are opened. Then, ammonia gas and air are supplied to the combustor 35, the reformer 23, and the ammonia engine 2.

Further, the outside air temperature is detected by the intake air temperature sensor 43, the temperature of the reforming catalyst 33 of the reformer 23 is detected by the temperature sensor 44, and the voltage of the battery 46 is detected by the voltage sensor 47. Then, the combustion time count value of the combustor 35 is calculated based on the outside air temperature, the temperature of the reforming catalyst 33, and the voltage of the battery 46.

When the ignition plug 40 of the combustor 35 is turned on and ammonia gas and air are supplied to the combustor 35, the ammonia gas is ignited and combusted. Specifically, as shown in the following formula, ammonia and oxygen in air chemically react with each other to generate high-temperature combustion gas (exothermic reaction).

$$NH_3 + 3/4 O_2 \rightarrow 1/2 N_2 + 3/2 H_2O \qquad (A)$$

The high-temperature combustion gas flows from the combustor 35 through the supply pipe 39, and is supplied to the reformer 23. Then, the reforming catalyst 33 of the reformer 23 is heated by the heat of the combustion gas, and thereby the temperature of the reforming catalyst 33 is increased. When the temperature of the reforming catalyst 33 reaches the activation temperature (combustible temperature), the ammonia gas is combusted by the reforming catalyst 33, thereby the exothermic reaction of Formula (A) above occurs, and the temperature of the reforming catalyst 33 is further increased by the self-heat of the reforming catalyst 33.

After that, when the count value of the TDC counter 48 reaches the combustion time count value, the ignition plug 40 of the combustor 35 is turned off, and the combustion injector 38 and the combustion throttle valve 37 are closed; thereby, the supply of ammonia gas and air to the combustor 35 is stopped. Thereby, the combustion of ammonia gas by the combustor 35 ends.

Further, when the count value of the TDC counter 48 reaches the combustion time count value, the temperature of the reforming catalyst 33 reaches the reaction temperature (described above), and thus ammonia gas is reformed by the reforming catalyst 33. Specifically, as shown in the following formula, decomposition reaction of ammonia occurs (endothermic reaction), and a reformed gas containing hydrogen is generated. The reformed gas flows through the reformed gas flow path 27 and the intake passage 3, and is supplied to the ammonia engine 2.

$$NH_3 \rightarrow 3/2 H_2 + 1/2 N_2 \qquad (B)$$

Further, when the count value of the TDC counter 48 reaches the combustion time count value, the degrees of opening of the reforming injector 26, the reforming throttle valve 25, the main injector 5, and the main throttle valve 6 are controlled, and thereby the flow rates of ammonia gas and air supplied to the reformer 23 and the ammonia engine 2 are controlled. Then, in the ammonia engine 2, ammonia gas combusts together with hydrogen in the reformed gas. Thereby, the start operation of the ammonia engine 2 is completed, and the state transitions to the steady state.

As above, in the present embodiment, at the time of starting the ammonia engine 2, the starter 45 and the ignition plug 40 of the combustor 35 are turned on, and ammonia gas and air are supplied to the combustor 35; thereby, the ammonia gas is ignited and combusted in the combustor 35, and combustion gas is generated. Then, the reforming catalyst 33 of the reformer 23 is heated by the combustion gas, and ammonia gas and air are supplied to the reformer 23; thereby, a reformed gas containing hydrogen is generated in the reformer 23, and the reformed gas flows through the reformed gas flow path 27 and is supplied to the ammonia engine 2. Then, ammonia gas and air are supplied to the ammonia engine 2, and thereby the ammonia gas is mixed with hydrogen and combusted in the ammonia engine 2. Here, the outside air temperature, the temperature of the reforming catalyst 33, and the operating environment of the combustor 35 are detected. Then, the combustion time of the combustor 35 is determined based on the outside air temperature, the temperature of the reforming catalyst 33, and the operating environment of the combustor 35. When the combustion time elapses from the beginning of starting the ammonia engine 2, the ignition plug 40 of the combustor 35 is turned off, and the supply of ammonia gas to the combustor 35 is stopped. By thus detecting the operating environment of the combustor 35 in addition to the outside air temperature and the temperature of the reforming catalyst 33, an appropriate period of combustion time according to the operating environment of the combustor 35 is obtained, and therefore an excessive temperature increase and an insufficient temperature increase of the reforming catalyst 33 of the reformer 23 are prevented. Thereby, the temperature of the reforming catalyst 33 of the reformer 23 is increased to an appropriate temperature regardless of the operating environment of the combustor 35. As a result, deterioration of the reforming catalyst 33 can be prevented, and a desired amount of hydrogen can be generated by the reformer 23.

Further, in the present embodiment, an addition count value C1 according to the outside air temperature, an addition count value C2 according to the temperature of the reforming catalyst 33, and an addition count value C3 according to the operating environment of the combustor 35 are set, and the addition count values C1 to C3 are added to a reference TDC count value x determined in advance; thereby, the combustion time of the combustor 35 is determined. Therefore, an appropriate period of combustion time considering the outside air temperature, the temperature of the reforming catalyst 33, and the operating environment of the combustor 35 is easily obtained by simple calculation processing.

In the present embodiment, the operating environment of the combustor 35 is a quantity of state regarding the flow rates of ammonia gas and air supplied to the combustor 35. When the flow rates of ammonia gas and air supplied to the combustor 35 change, the time required to heat the reforming catalyst 33 of the reformer 23 changes. Thus, by detecting a quantity of state regarding the flow rates of ammonia gas and air supplied to the combustor 35, an appropriate period of combustion time according to the operating environment of the combustor 35 is obtained.

In the present embodiment, the voltage of the battery 46 that supplies power to the starter 45 is detected as a quantity of state regarding the flow rates of ammonia gas and air supplied to the combustor 35. When the voltage of the battery 46 decreases, the rotation rate of the starter motor of the starter 45 decreases, and accordingly the engine rotation rate at the time of cranking the ammonia engine 2 decreases. Therefore, the total flow rate of ammonia gas and air supplied to the combustor 35 decreases, and the amount of heat given from the combustor 35 to the reformer 23 decreases; accordingly, the heating of the reforming catalyst 33 of the reformer 23 becomes slower. Thus, by detecting the voltage of the battery 46 and determining the combustion time of the combustor 35 while considering the voltage of the battery 46, an appropriate period of combustion time is obtained even when the voltage of the battery 46 changes.

Further, in the present embodiment, whether or not it is the timing to stop the combustion operation by the combustor 35 can be determined by effectively using the existing TDC counter 48.

Figure 5:
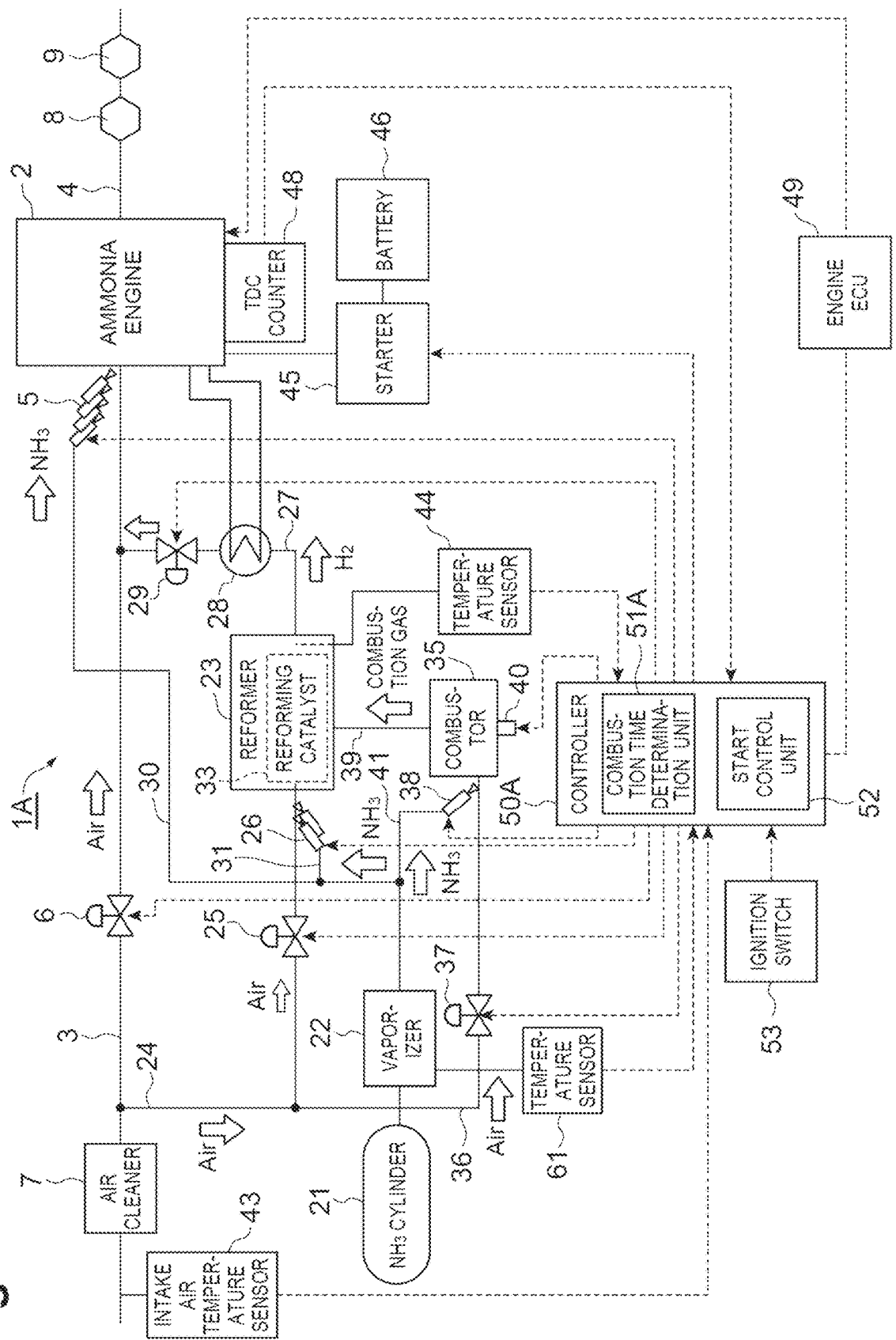
FIG. 5 is a schematic configuration diagram showing an engine system according to a second embodiment of the present disclosure.

FIG. 5 is a schematic configuration diagram showing an engine system according to a second embodiment of the present disclosure. In FIG. 5, an engine system 1A of the present embodiment includes a temperature sensor 61 in place of the voltage sensor 47 in the above first embodiment.

The temperature sensor 61 is a sensor that detects the temperature of the vaporizer 22. The temperature sensor 61 forms an operating environment detection unit that detects the operating environment of the combustor 35. When the temperature of the vaporizer 22 changes, the pressure of ammonia gas generated by the vaporizer 22 changes, and accordingly the flow rate of ammonia gas supplied to the combustor 35 changes. Therefore, the temperature of the vaporizer 22 corresponds to, as the operating environment of the combustor 35, a quantity of state regarding the flow rate of ammonia gas supplied to the combustor 35.

Further, the engine system 1A includes a controller 50A in place of the controller 50 in the above first embodiment. The controller 50A includes a combustion time determination unit 51A and the start control unit 52 described above.

The combustion time determination unit 51A determines the combustion time of the combustor 35 based on the outside air temperature detected by the intake air temperature sensor 43, the temperature of the reforming catalyst 33 detected by the temperature sensor 44, and the temperature of the vaporizer 22 detected by the temperature sensor 61.

Figure 6:
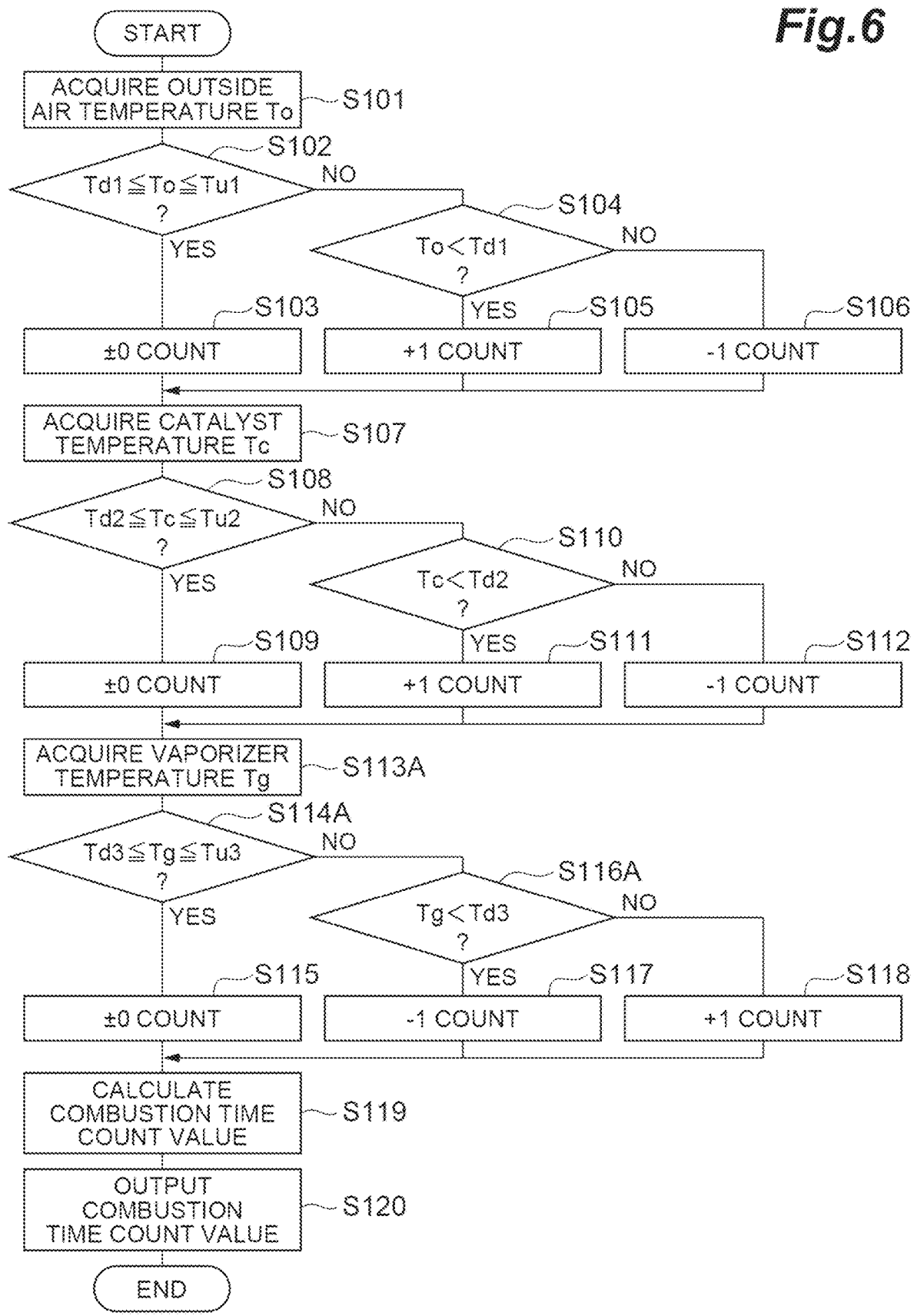
FIG. 6 is a flowchart showing a procedure of combustion time determination processing executed by a combustion time determination unit shown in FIG. 5.

FIG. 6 is a flowchart showing a procedure of combustion time determination processing executed by the combustion time determination unit 51A, and corresponds to FIG. 3.

In FIG. 6, after executing any of steps S109, S111, and S112 above, the combustion time determination unit 51A acquires the temperature Tg of the vaporizer 22 detected by the temperature sensor 61 (step S113A). Then, the combustion time determination unit 51A determines whether or not the temperature Tg of the vaporizer 22 is equal to or higher than threshold Td3 and equal to or lower than threshold Tu3 (step S114A).

When the combustion time determination unit 51A determines that the condition that the temperature Tg of the vaporizer 22 be equal to or higher than threshold Td3 and equal to or lower than threshold Tu3 is satisfied, the combustion time determination unit 51A sets an addition count value C3 to the ±0 count (step S115).

When the combustion time determination unit 51A determines that the condition that the temperature Tg of the vaporizer 22 be equal to or higher than threshold Td3 and equal to or lower than threshold Tu3 is not satisfied, the combustion time determination unit 51A determines whether or not the temperature Tg of the vaporizer 22 is lower than threshold Td3 (step S116A). When the combustion time determination unit 51A determines that the temperature Tg of the vaporizer 22 is lower than threshold Td3, the combustion time determination unit 51A sets the addition count value C3 to the −1 count (step S117).

When the combustion time determination unit 51A determines that the temperature Tg of the vaporizer 22 is not lower than threshold Td3, that is, the temperature Tg of the vaporizer 22 is higher than threshold Tu3, the combustion time determination unit 51A sets the addition count value C3 to the +1 count (step S118). After that, the combustion time determination unit 51A sequentially executes steps S119 and S120 above.

In the present embodiment thus configured, the operating environment of the combustor 35 is a quantity of state regarding the flow rate of ammonia gas supplied to the combustor 35. When the flow rate of ammonia gas supplied to the combustor 35 changes, the time required to heat the reforming catalyst 33 of the reformer 23 changes. Thus, by detecting a quantity of state regarding the flow rate of ammonia gas supplied to the combustor 35, an appropriate period of combustion time according to the operating environment of the combustor 35 is obtained.

In the present embodiment, the temperature of the vaporizer 22 is detected as a quantity of state regarding the flow rate of ammonia gas supplied to the combustor 35. When the temperature of the vaporizer 22 increases, the pressure of ammonia gas generated by the vaporizer 22 increases, and accordingly the flow rate of ammonia gas supplied to the combustor 35 increases. Therefore, the temperature of combustion gas decreases, and accordingly the heating of the reforming catalyst 33 of the reformer 23 becomes slower. Thus, by detecting the temperature of the vaporizer 22 and determining the combustion time of the combustor 35 while considering the temperature of the vaporizer 22, an appropriate period of combustion time is obtained even when the temperature of the vaporizer 22 changes.

Figure 7:
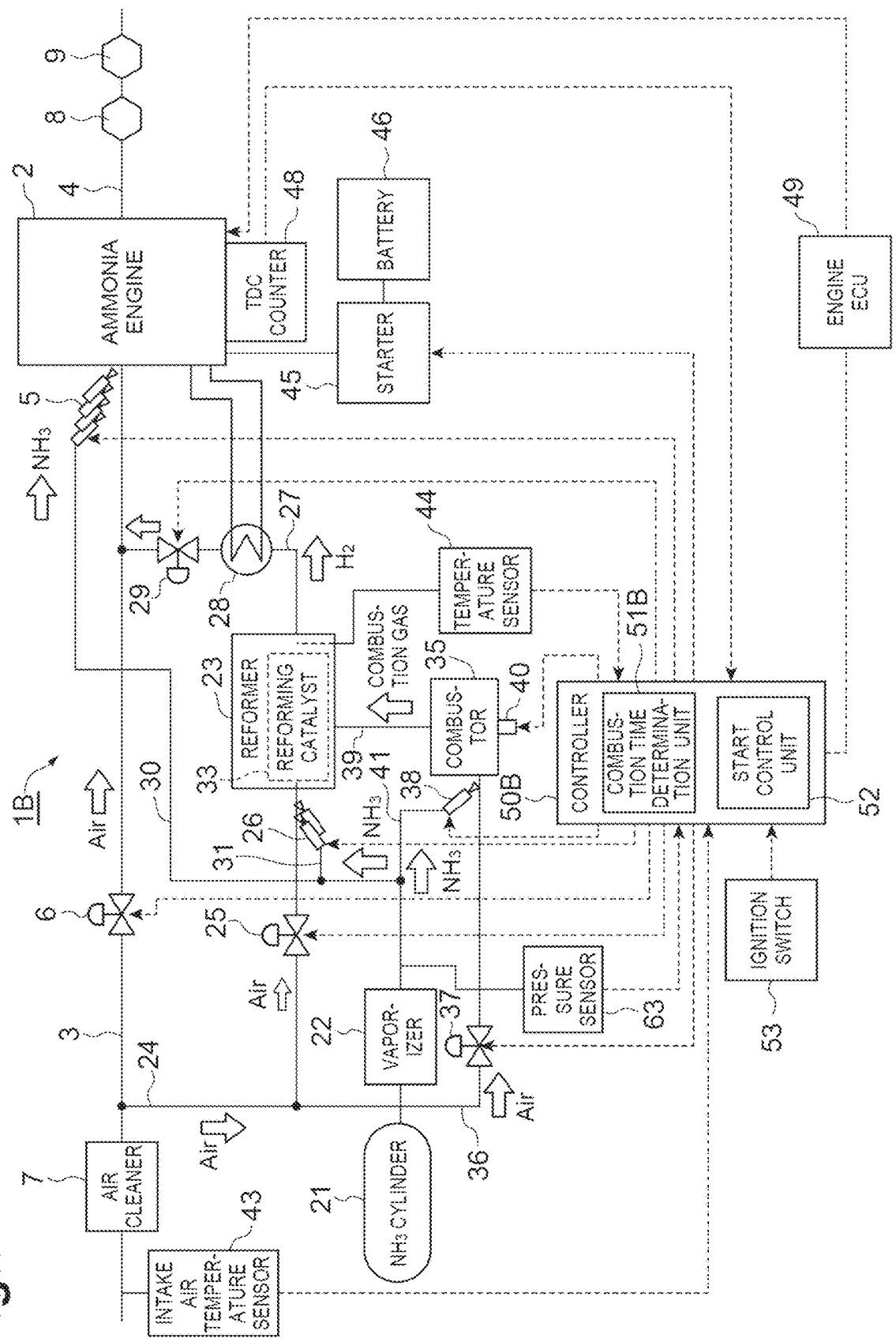
FIG. 7 is a schematic configuration diagram showing an engine system according to a third embodiment of the present disclosure.

FIG. 7 is a schematic configuration diagram showing an engine system according to a third embodiment of the present disclosure. In FIG. 7, an engine system 1B of the present embodiment includes a pressure sensor 63 in place of the voltage sensor 47 in the above first embodiment.

The pressure sensor 63 is a sensor that detects the pressure of ammonia gas generated by the vaporizer 22. The pressure sensor 63 forms an operating environment detection unit that detects the operating environment of the combustor 35. When the pressure of ammonia gas generated by the vaporizer 22 changes, the flow rate of ammonia gas supplied to the combustor 35 changes as described above in the second embodiment. Therefore, the pressure of ammonia gas generated by the vaporizer 22 corresponds to, as the operating environment of the combustor 35, a quantity of state regarding the flow rate of ammonia gas supplied to the combustor 35.

Further, the engine system 1B includes a controller 50B in place of the controller 50 in the above first embodiment. The controller 50B includes a combustion time determination unit 51B and the start control unit 52 described above.

The combustion time determination unit 51B determines the combustion time of the combustor 35 based on the outside air temperature detected by the intake air temperature sensor 43, the temperature of the reforming catalyst 33 detected by the temperature sensor 44, and the pressure of ammonia gas detected by the pressure sensor 63.

Figure 8:
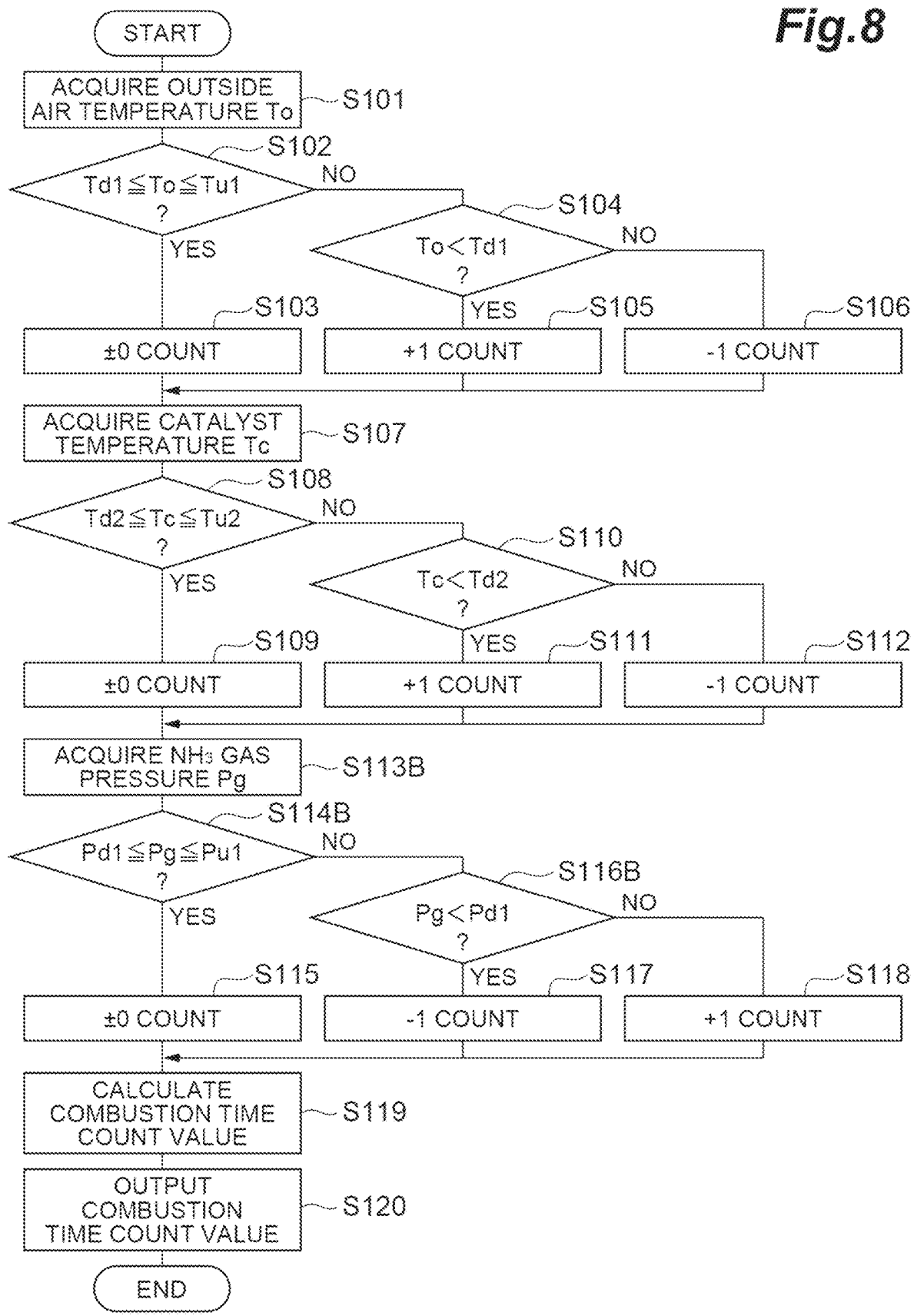
FIG. 8 is a flowchart showing a procedure of combustion time determination processing executed by a combustion time determination unit shown in FIG. 7.

FIG. 8 is a flowchart showing a procedure of combustion time determination processing executed by the combustion time determination unit 51B, and corresponds to FIG. 3.

In FIG. 8, after executing any of steps S109, S111, and S112 above, the combustion time determination unit 51B acquires the pressure Pg of ammonia gas detected by the pressure sensor 63 (step S113B). Then, the combustion time determination unit 51B determines whether or not the pressure Pg of ammonia gas is equal to or higher than threshold Pd1 and equal to or lower than threshold Pu1 (step S114B).

When the combustion time determination unit 51B determines that the condition that the pressure Pg of ammonia gas be equal to or higher than threshold Pd1 and equal to or lower than threshold Pu1 is satisfied, the combustion time determination unit 51B sets an addition count value C3 to the ±0 count (step S115).

When the combustion time determination unit 51B determines that the condition that the pressure Pg of ammonia gas be equal to or higher than threshold Pd1 and equal to or lower than threshold Pu1 is not satisfied, the combustion time determination unit 51B determines whether or not the pressure Pg of ammonia gas is lower than threshold Pd1 (step S116B). When the combustion time determination unit 51B determines that the pressure Pg of ammonia gas is lower than threshold Pd1, the combustion time determination unit 51B sets the addition count value C3 to the −1 count (step S117).

When the combustion time determination unit 51B determines that the pressure Pg of ammonia gas is not lower than threshold Pd1, that is, the pressure Pg of ammonia gas is higher than threshold Pu1, the combustion time determination unit 51B sets the addition count value C3 to the +1 count (step S118). After that, the combustion time determination unit 51B sequentially executes steps S119 and S120 above.

In the present embodiment thus configured, the pressure of ammonia gas generated by the vaporizer 22 is detected as a quantity of state regarding the flow rate of ammonia gas supplied to the combustor 35. When the pressure of ammonia gas generated by the vaporizer 22 increases, like in the above second embodiment, the flow rate of ammonia gas supplied to the combustor 35 increases, and the temperature of combustion gas decreases; accordingly, the heating of the reforming catalyst 33 of the reformer 23 becomes slower. Thus, by detecting the pressure of ammonia gas generated by the vaporizer 22 and determining the combustion time of the combustor 35 while considering the pressure of ammonia gas, an appropriate period of combustion time is obtained even when the pressure of ammonia gas generated by the vaporizer 22 changes.

Figure 9:
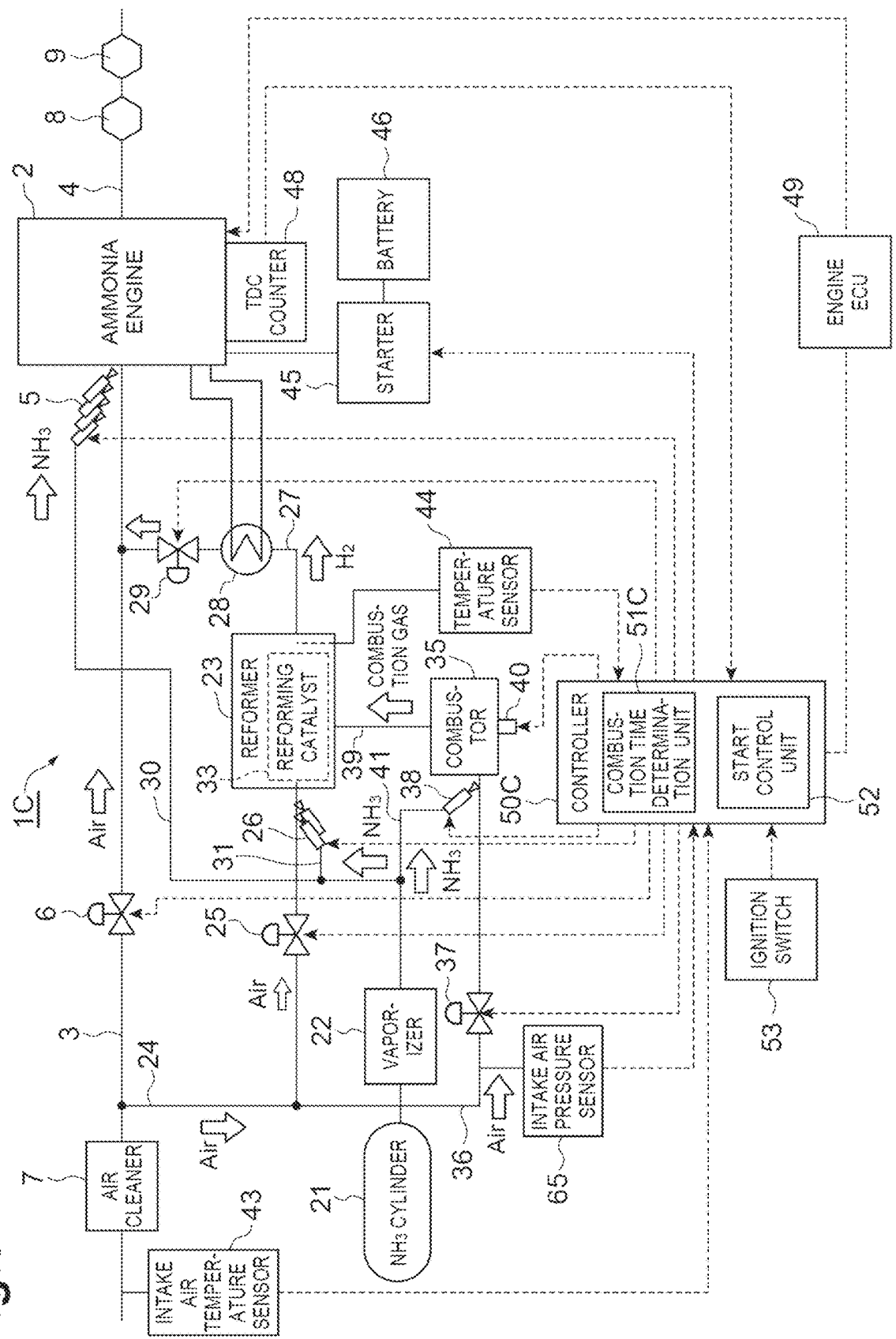
FIG. 9 is a schematic configuration diagram showing an engine system according to a fourth embodiment of the present disclosure.

FIG. 9 is a schematic configuration diagram showing an engine system according to a fourth embodiment of the present disclosure. In FIG. 9, an engine system 1C of the present embodiment includes an intake air pressure sensor 65 in place of the voltage sensor 47 in the above first embodiment.

The intake air pressure sensor 65 is a sensor that detects the pressure of air flowing through the air flow path 36. The intake air pressure sensor 65 forms an operating environment detection unit that detects the operating environment of the combustor 35. When the pressure of air flowing through the air flow path 36 changes, the concentration of oxygen contained in the air supplied to the combustor 35 changes. Therefore, the pressure of air flowing through the air flow path 36 corresponds to, as the operating environment of the combustor 35, a quantity of state regarding the concentration of oxygen contained in the air supplied to the combustor 35.

Further, the engine system 1C includes a controller 50C in place of the controller 50 in the above first embodiment. The controller 50C includes a combustion time determination unit 51C and the start control unit 52 described above.

The combustion time determination unit 51C determines the combustion time of the combustor 35 based on the outside air temperature detected by the intake air temperature sensor 43, the temperature of the reforming catalyst 33 detected by the temperature sensor 44, and the pressure of air detected by the intake air pressure sensor 65.

Figure 10:
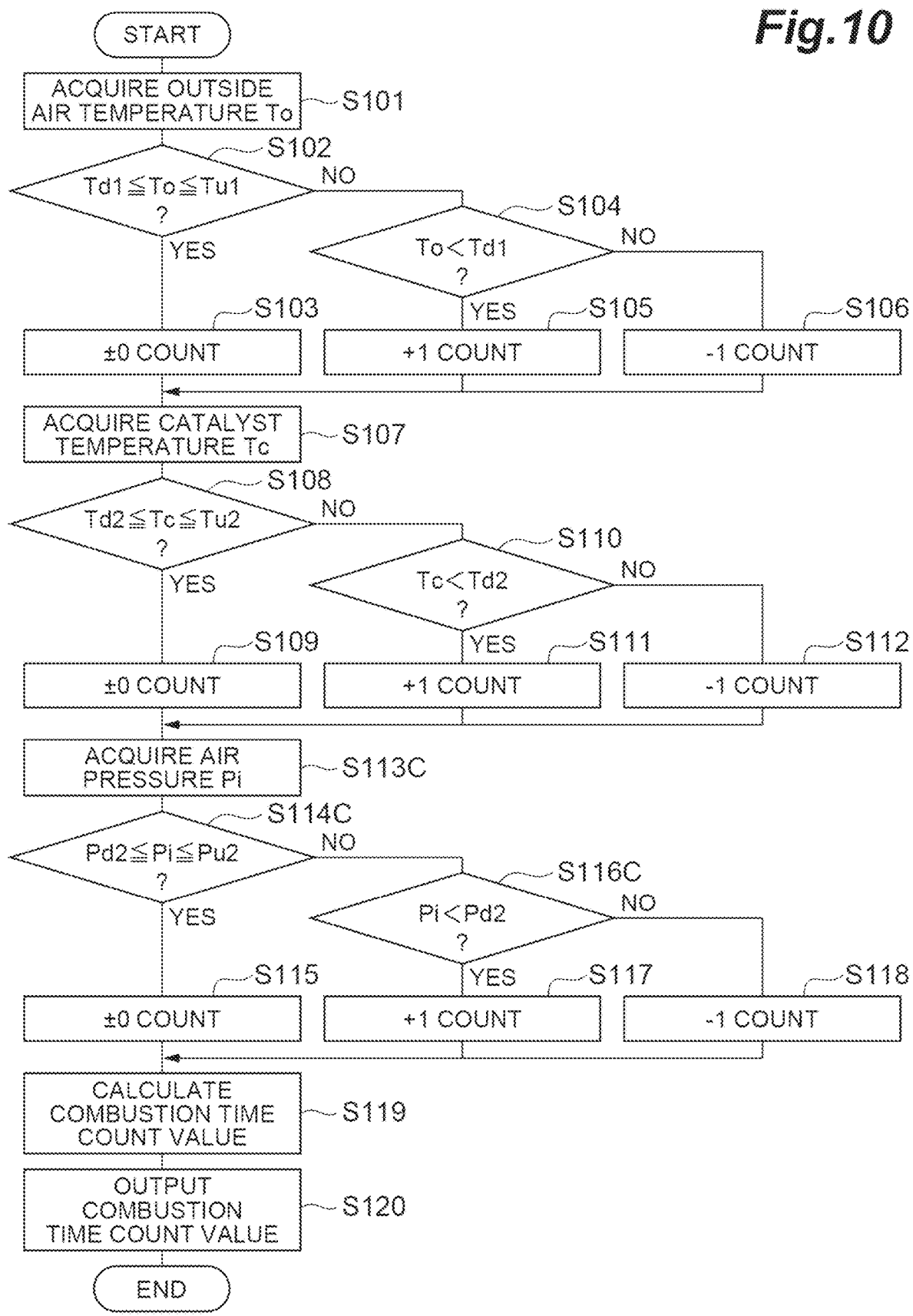
FIG. 10 is a flowchart showing a procedure of combustion time determination processing executed by a combustion time determination unit shown in FIG. 9.

FIG. 10 is a flowchart showing a procedure of combustion time determination processing executed by the combustion time determination unit 51C, and corresponds to FIG. 3.

In FIG. 10, after executing any of steps S109, S111, and S112 above, the combustion time determination unit 51C acquires the pressure Pi of air detected by the intake air pressure sensor 65 (step S113C). Then, the combustion time determination unit 51C determines whether or not the pressure Pi of air is equal to or higher than threshold Pd2 and equal to or lower than threshold Pu2 (step S114C).

When the combustion time determination unit 51C determines that the condition that the pressure Pi of air be equal to or higher than threshold Pd2 and equal to or lower than threshold Pu2 is satisfied, the combustion time determination unit 51C sets an addition count value C3 to the ±0 count (step S115).

When the combustion time determination unit 51C determines that the condition that the pressure Pi of air be equal to or higher than threshold Pd2 and equal to or lower than threshold Pu2 is not satisfied, the combustion time determination unit 51C determines whether or not the pressure Pi of air is lower than threshold Pd2 (step S116C). When the combustion time determination unit 51C determines that the pressure Pi of air is lower than threshold Pd2, the combustion time determination unit 51C sets the addition count value C3 to the +1 count (step S117).

When the combustion time determination unit 51C determines that the pressure Pi of air is not lower than threshold Pd2, that is, the pressure Pi of air is higher than threshold Pu2, the combustion time determination unit 51C sets the addition count value C3 to the −1 count (step S118). After that, the combustion time determination unit 51C sequentially executes steps S119 and S120 above.

In the present embodiment thus configured, the operating environment of the combustor 35 is a quantity of state regarding the concentration of oxygen contained in the air supplied to the combustor 35. When the concentration of oxygen contained in the air supplied to the combustor 35 changes, the time required to heat the reforming catalyst 33 of the reformer 23 changes. Thus, by detecting a quantity of state regarding the concentration of oxygen contained in the air supplied to the combustor 35, an appropriate period of combustion time according to the operating environment of the combustor 35 is obtained.

In the present embodiment, the pressure of air flowing through the air flow path 36 is detected as a quantity of state regarding the concentration of oxygen contained in the air supplied to the combustor 35. When the pressure of air flowing through the air flow path 36 becomes lower than atmospheric pressure, the concentration of oxygen contained in the air supplied to the combustor 35 decreases, and accordingly the fuel gas is less likely to be combusted. Thus, by detecting the pressure of air flowing through the air flow path 36 and determining the combustion time of the combustor 35 while considering the pressure of air, an appropriate period of combustion time is obtained even when the pressure of air supplied to the combustor 35 changes.

Figure 11:
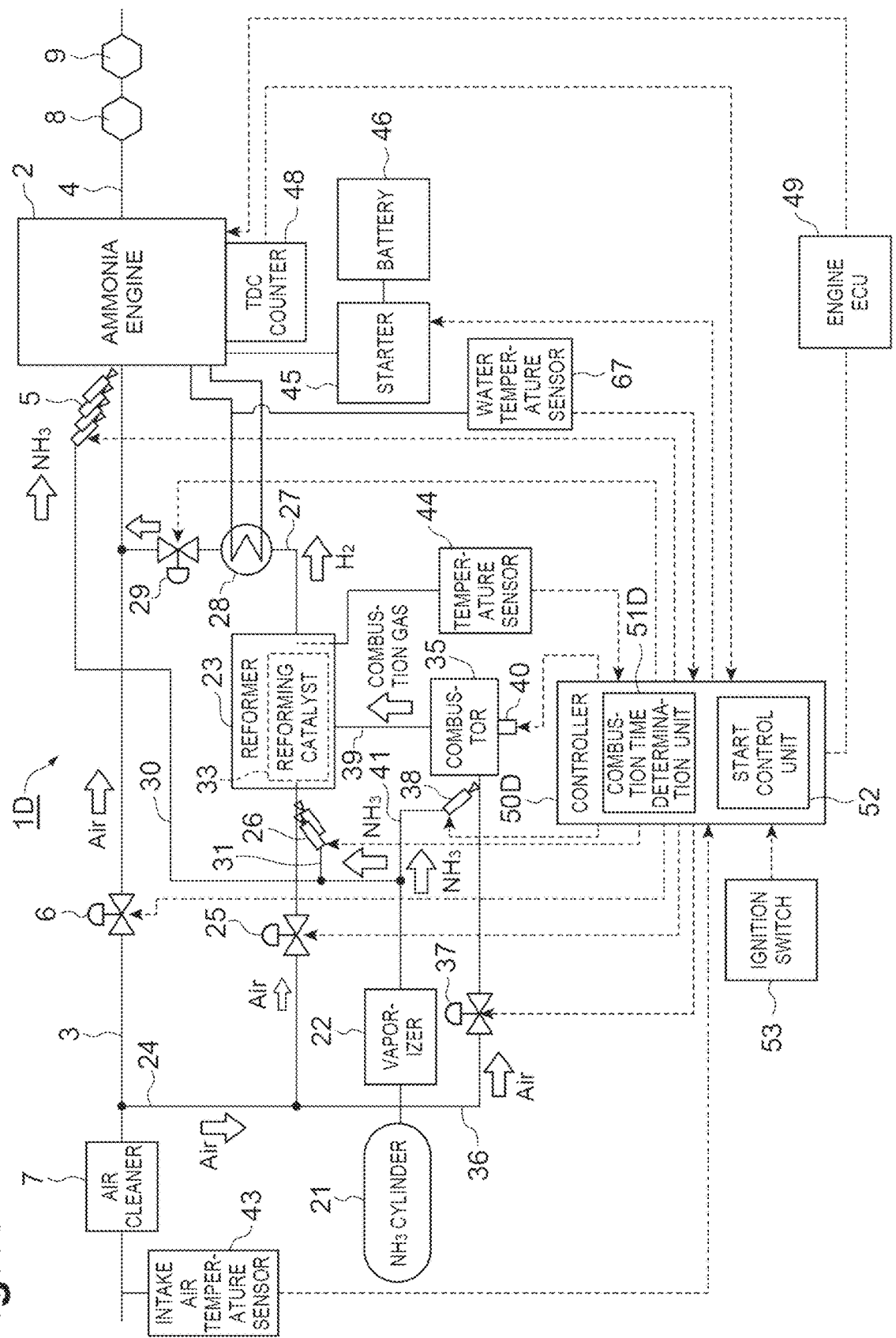
FIG. 11 is a schematic configuration diagram showing an engine system according to a fifth embodiment of the present disclosure.

FIG. 11 is a schematic configuration diagram showing an engine system according to a fifth embodiment of the present disclosure. In FIG. 11, an engine system 1D of the present embodiment includes a water temperature sensor 67 in place of the voltage sensor 47 in the above first embodiment.

The water temperature sensor 67 is a sensor that detects the temperature of cooling water for cooling the ammonia engine 2. The water temperature sensor 67 forms an operating environment detection unit that detects the operating environment of the combustor 35. When the warming-up state of the ammonia engine 2 changes, the amount of hydrogen generated that is required of the reformer 23 changes. Therefore, the water temperature sensor 67 corresponds to, as the operating environment of the combustor 35, a quantity of state regarding the amount of hydrogen generated that is required of the reformer 23.

Further, the engine system 1D includes a controller 50D in place of the controller 50 in the above first embodiment. The controller 50D includes a combustion time determination unit 51D and the start control unit 52 described above.

The combustion time determination unit 51D determines the combustion time of the combustor 35 based on the outside air temperature detected by the intake air temperature sensor 43, the temperature of the reforming catalyst 33 detected by the temperature sensor 44, and the temperature of cooling water detected by the water temperature sensor 67.

Figure 12:
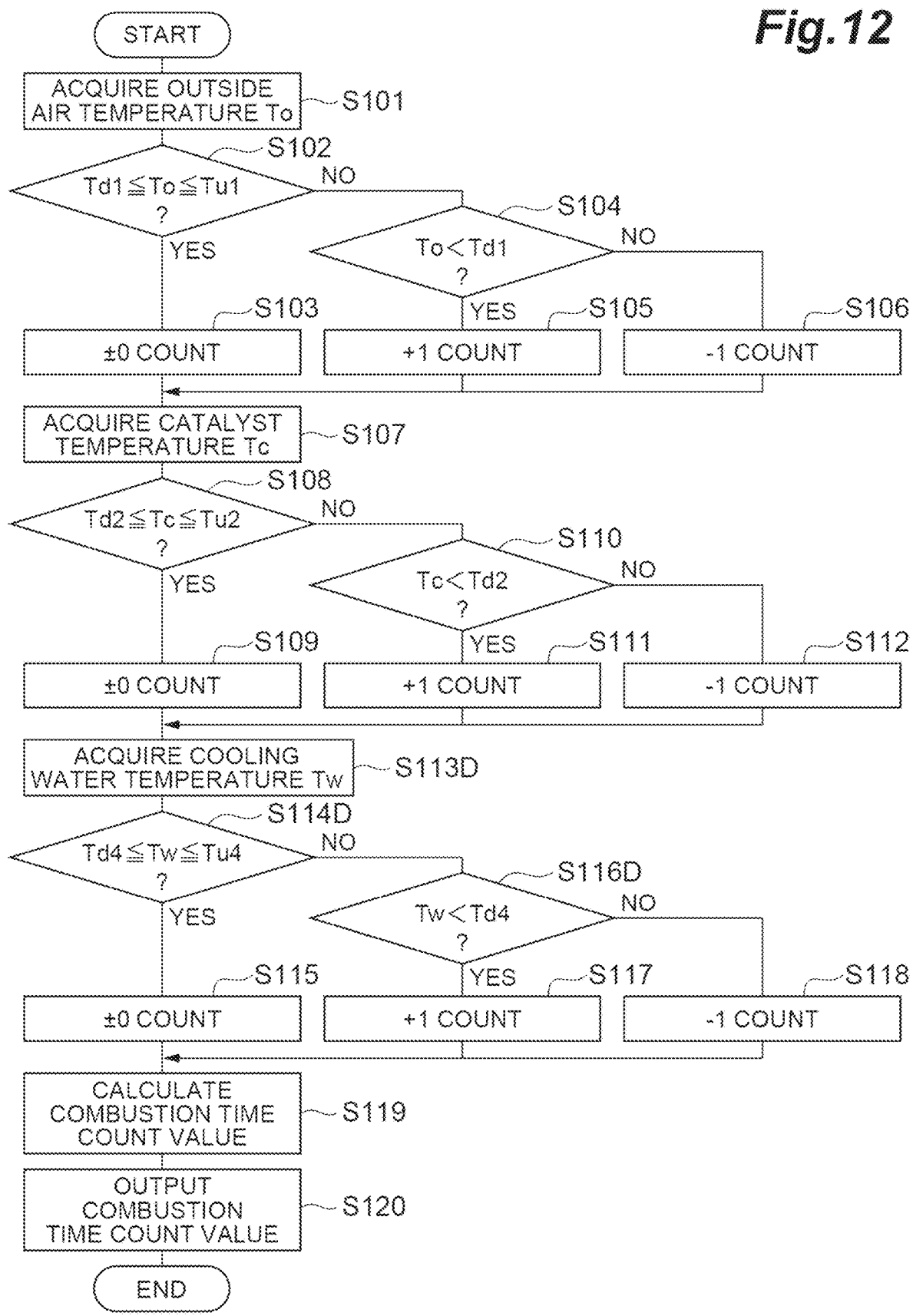
FIG. 12 is a flowchart showing a procedure of combustion time determination processing executed by a combustion time determination unit shown in FIG. 11.

FIG. 12 is a flowchart showing a procedure of combustion time determination processing executed by the combustion time determination unit 51D, and corresponds to FIG. 3.

In FIG. 12, after executing any of steps S109, S111, and S112 above, the combustion time determination unit 51D acquires the temperature Tw of cooling water detected by the water temperature sensor 67 (step S113D). Then, the combustion time determination unit 51D determines whether or not the temperature Tw of cooling water is equal to or higher than threshold Td4 and equal to or lower than threshold Tu4 (step S114D).

When the combustion time determination unit 51D determines that the condition that the temperature Tw of cooling water be equal to or higher than threshold Td4 and equal to or lower than threshold Tu4 is satisfied, the combustion time determination unit 51D sets an addition count value C3 to the ±0 count (step S115).

When the combustion time determination unit 51D determines that the condition that the temperature Tw of cooling water be equal to or higher than threshold Td4 and equal to or lower than threshold Tu4 is not satisfied, the combustion time determination unit 51D determines whether or not the temperature Tw of cooling water is lower than threshold Td4 (step S116D). When the combustion time determination unit 51D determines that the temperature Tw of cooling water is lower than threshold Td4, the combustion time determination unit 51D sets the addition count value C3 to the +1 count (step S117).

When the combustion time determination unit 51D determines that the temperature Tw of cooling water is not lower than threshold Td4, that is, the temperature Tw of cooling water is higher than threshold Tu4, the combustion time determination unit 51D sets the addition count value C3 to the −1 count (step S118). After that, the combustion time determination unit 51D sequentially executes steps S119 and S120 above.

In the present embodiment thus configured, the operating environment of the combustor 35 is a quantity of state regarding the amount of hydrogen generated that is required of the reformer 23. When the amount of hydrogen generated that is required of the reformer 23 changes, the time required to heat the reforming catalyst 33 of the reformer 23 changes. Thus, by detecting a quantity of state regarding the amount of hydrogen generated that is required of the reformer 23, an appropriate period of combustion time according to the operating environment of the combustor 35 is obtained.

In the present embodiment, the temperature of cooling water for cooling the ammonia engine 2 is detected as a quantity of state regarding the amount of hydrogen generated that is required of the reformer 23. When the ammonia engine 2 is in a warming-up state higher temperature than the state at the time of the cold start, the amount of hydrogen generated that is required of the reformer 23 can be less than at the time of the cold start. Thus, by detecting the temperature of cooling water for cooling the ammonia engine 2, an appropriate period of combustion time is obtained even when the warming-up state of the ammonia engine 2 changes.

Figure 13:
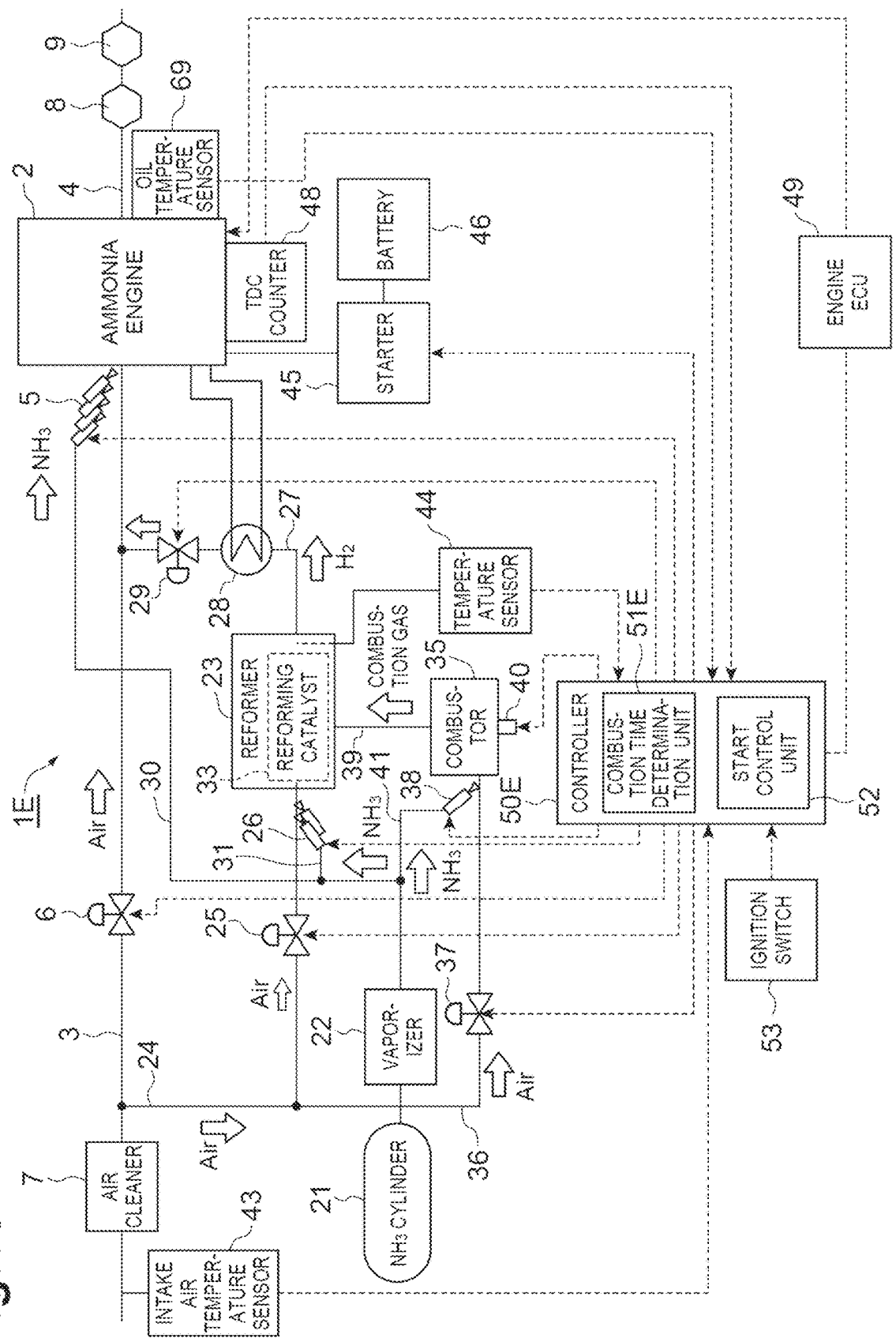
FIG. 13 is a schematic configuration diagram showing an engine system according to a sixth embodiment of the present disclosure.

FIG. 13 is a schematic configuration diagram showing an engine system according to a sixth embodiment of the present disclosure. In FIG. 13, an engine system 1E of the present embodiment includes an oil temperature sensor 69 in place of the voltage sensor 47 in the above first embodiment.

The oil temperature sensor 69 is a sensor that detects the temperature of engine oil in the ammonia engine 2. The oil temperature sensor 69 forms an operating environment detection unit that detects the operating environment of the combustor 35. As described above in the fifth embodiment, when the warming-up state of the ammonia engine 2 changes, the amount of hydrogen generated that is required of the reformer 23 changes. Therefore, the oil temperature sensor 69 corresponds to, as the operating environment of the combustor 35, a quantity of state regarding the amount of hydrogen generated that is required of the reformer 23.

Further, the engine system 1E includes a controller 50E in place of the controller 50 in the above first embodiment. The controller 50E includes a combustion time determination unit 51E and the start control unit 52 described above.

The combustion time determination unit 51E determines the combustion time of the combustor 35 based on the outside air temperature detected by the intake air temperature sensor 43, the temperature of the reforming catalyst 33 detected by the temperature sensor 44, and the temperature of engine oil detected by the oil temperature sensor 69.

Figure 14:
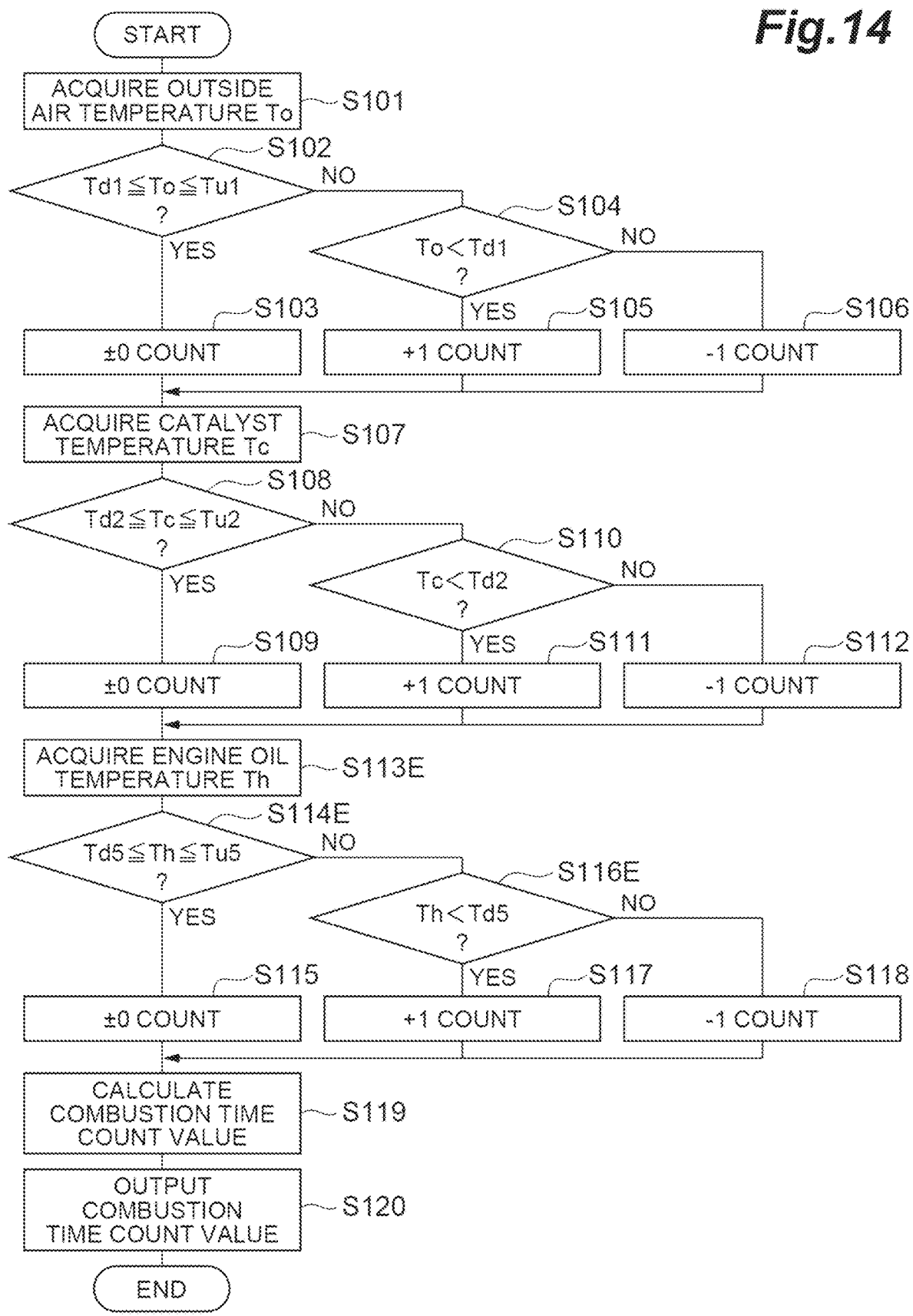
FIG. 14 is a flowchart showing a procedure of combustion time determination processing executed by a combustion time determination unit shown in FIG. 13.

FIG. 14 is a flowchart showing a procedure of combustion time determination processing executed by the combustion time determination unit 51E, and corresponds to FIG. 3.

In FIG. 14, after executing any of steps S109, S111, and S112 above, the combustion time determination unit 51E acquires the temperature Th of engine oil detected by the oil temperature sensor 69 (step S113E). Then, the combustion time determination unit 51E determines whether or not the temperature Th of engine oil is equal to or higher than threshold Td5 and equal to or lower than threshold Tu5 (step S114E).

When the combustion time determination unit 51E determines that the condition that the temperature Th of engine oil be equal to or higher than threshold Td5 and equal to or lower than threshold Tu5 is satisfied, the combustion time determination unit 51E sets an addition count value C3 to the ±0 count (step S115).

When the combustion time determination unit 51E determines that the condition that the temperature Th of engine oil be equal to or higher than threshold Td5 and equal to or lower than threshold Tu5 is not satisfied, the combustion time determination unit 51E determines whether or not the temperature Th of engine oil is lower than threshold Td5 (step S116E). When the combustion time determination unit 51E determines that the temperature Th of engine oil is lower than threshold Td5, the combustion time determination unit 51E sets the addition count value C3 to the +1 count (step S117).

When the combustion time determination unit 51E determines that the temperature Th of engine oil is not lower than threshold Td5, that is, the temperature Th of engine oil is higher than threshold Tu5, the combustion time determination unit 51E sets the addition count value C3 to the −1 count (step S118). After that, the combustion time determination unit 51E sequentially executes steps S119 and S120 above.

In the present embodiment thus configured, the temperature of engine oil in the ammonia engine 2 is detected as a quantity of state regarding the amount of hydrogen generated that is required of the reformer 23. As described above in the fifth embodiment, when the ammonia engine 2 is in a warming-up state higher temperature than the state at the time of the cold start, the amount of hydrogen generated that is required of the reformer 23 can be less than at the time of the cold start. Thus, by detecting the temperature of engine oil in the ammonia engine 2, an appropriate period of combustion time is obtained even when the warming-up state of the ammonia engine 2 changes.

Figure 15:
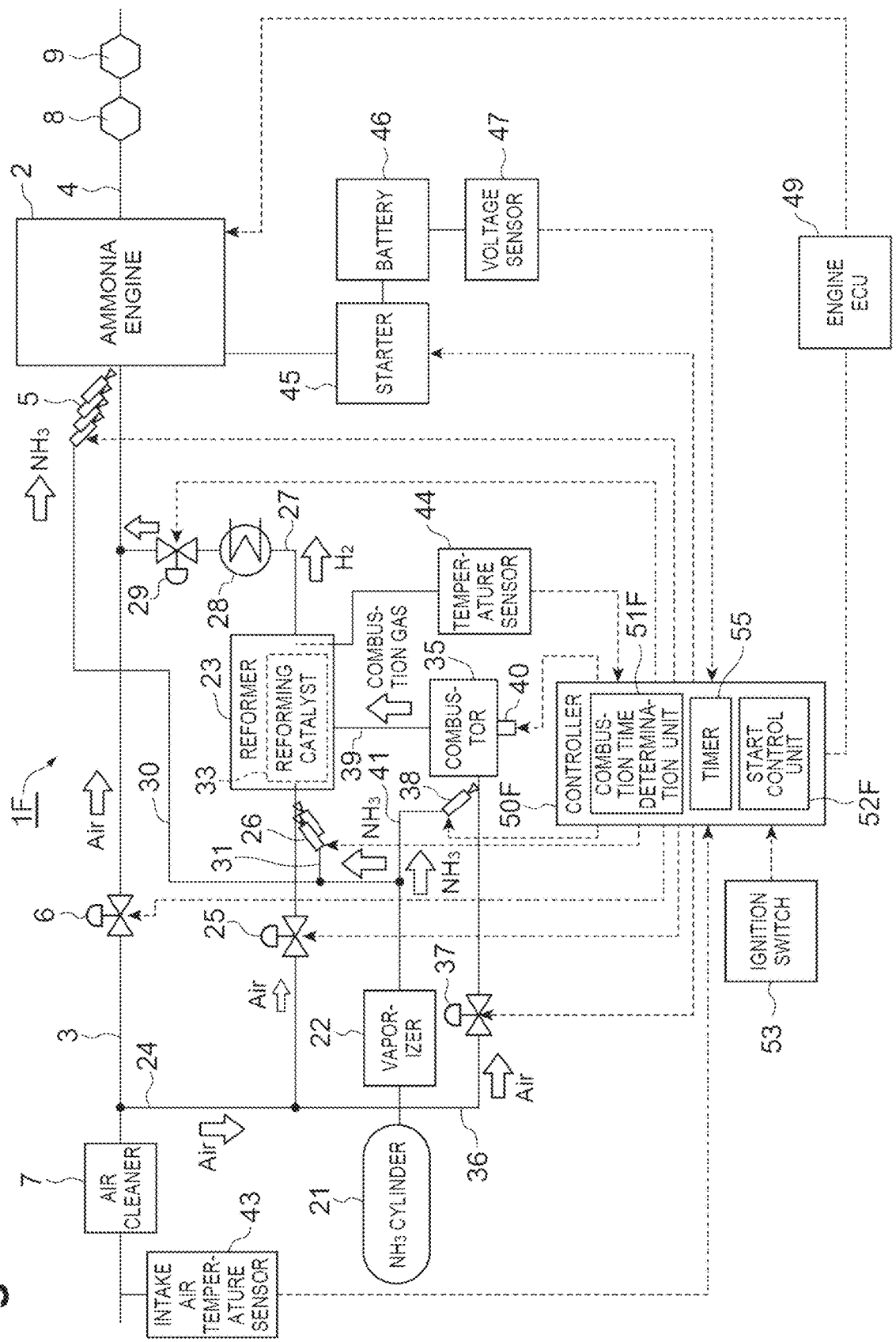
FIG. 15 is a schematic configuration diagram showing an engine system according to a seventh embodiment of the present disclosure.

FIG. 15 is a schematic configuration diagram showing an engine system according to a seventh embodiment of the present disclosure. In FIG. 15, an engine system 1F of the present embodiment includes, in place of the controller 50 in the above first embodiment, a controller 50F in which a timer 55 that measures time is incorporated. The controller 50F includes a combustion time determination unit 51F and a start control unit 52F.

Figure 16:
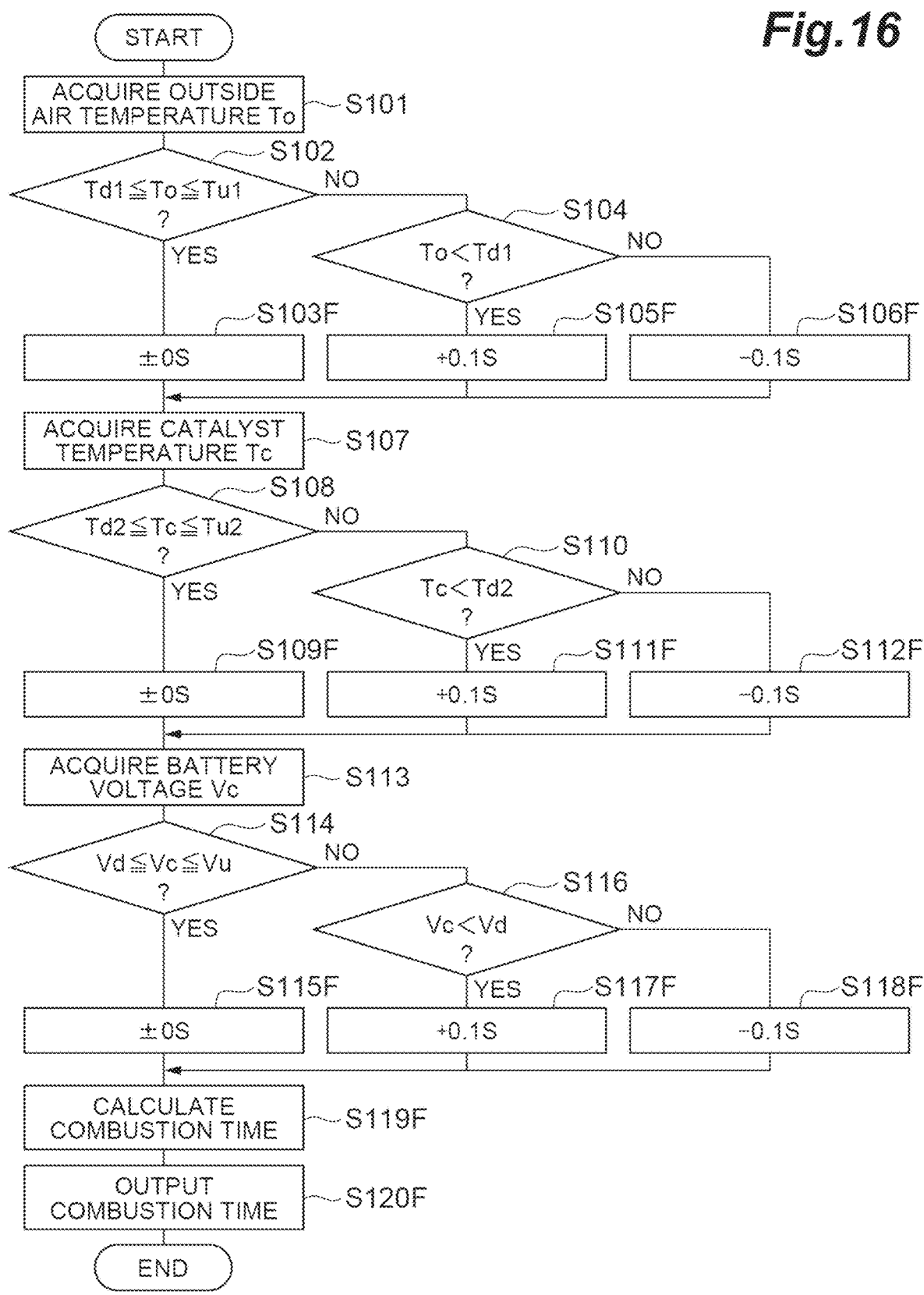
FIG. 16 is a flowchart showing a procedure of combustion time determination processing executed by a combustion time determination unit shown in FIG. 15.

FIG. 16 is a flowchart showing a procedure of combustion time determination processing executed by the combustion time determination unit 51F, and corresponds to FIG. 3. In the present processing, a reference period of time t0 of combustion is set in advance. The reference period of time t0 is such a value that the reforming catalyst 33 of the reformer 23 reaches the reaction temperature in the normal state.

In FIG. 16, when in step S101 above the combustion time determination unit 51F determines that the condition that the outside air temperature To be equal to or higher than threshold Td1 and equal to or lower than threshold Tu1 is satisfied, the combustion time determination unit 51F sets an addition period of time t1 to ±0 seconds (step S103F). The addition period of time t1 corresponds to a first period of time according to the outside air temperature To.

When in step S104 above the combustion time determination unit 51F determines that the outside air temperature To is lower than threshold Td1, the combustion time determination unit 51F sets the addition period of time t1 to +0.1 seconds (step S105F). When the combustion time determination unit 51F determines that the outside air temperature To is higher than threshold Tu1, the combustion time determination unit 51F sets the addition period of time t1 to −0.1 seconds (step S106F).

After that, when in step S108 above the combustion time determination unit 51F determines that the condition that the temperature Tc of the reforming catalyst 33 be equal to or higher than threshold Td2 and equal to or lower than threshold Tu2 is satisfied, the combustion time determination unit 51F sets an addition period of time t2 to ±0 seconds (step S109F). The addition period of time t2 corresponds to a second period of time according to the temperature Tc of the reforming catalyst 33.

When in step S110 above the combustion time determination unit 51F determines that the temperature Tc of the reforming catalyst 33 is lower than threshold Td2, the combustion time determination unit 51F sets the addition period of time t2 to +0.1 seconds (step S111F). When the combustion time determination unit 51F determines that the temperature Tc of the reforming catalyst 33 is higher than threshold Tu2, the combustion time determination unit 51F sets the addition period of time t2 to −0.1 seconds (step S112F).

After that, when in step S114 above the combustion time determination unit 51F determines that the condition that the voltage Vc of the battery 46 be equal to or higher than threshold Vd and equal to or lower than threshold Vu is satisfied, the combustion time determination unit 51F sets an addition period of time t3 to ±0 seconds (step S115F). The addition period of time t3 corresponds to a third period of time according to the voltage Vc of the battery 46.

When in step S116 above the combustion time determination unit 51F determines that the voltage Vc of the battery 46 is lower than threshold Vd, the combustion time determination unit 51F sets the addition period of time t3 to +0.1 seconds (step S117F). When the combustion time determination unit 51F determines that the voltage Vc of the battery 46 is higher than threshold Vu, the combustion time determination unit 51F sets the addition period of time t3 to −0.1 seconds (step S118F).

Subsequently, the combustion time determination unit 51F adds the addition periods of time t1 to t3 to the reference period of time to, and thereby calculates the combustion time of the combustor 35 (step S119F). Then, the combustion time determination unit 51F outputs the combustion time of the combustor 35 to the start control unit 52F (step S120F).

Although in the present processing each of the addition periods of time t1 to t3 is set to ±0 seconds, +0.1 seconds, or −0.1 seconds according to conditions, the addition periods of time t1 to t3 are not particularly limited thereto.

Figure 17:
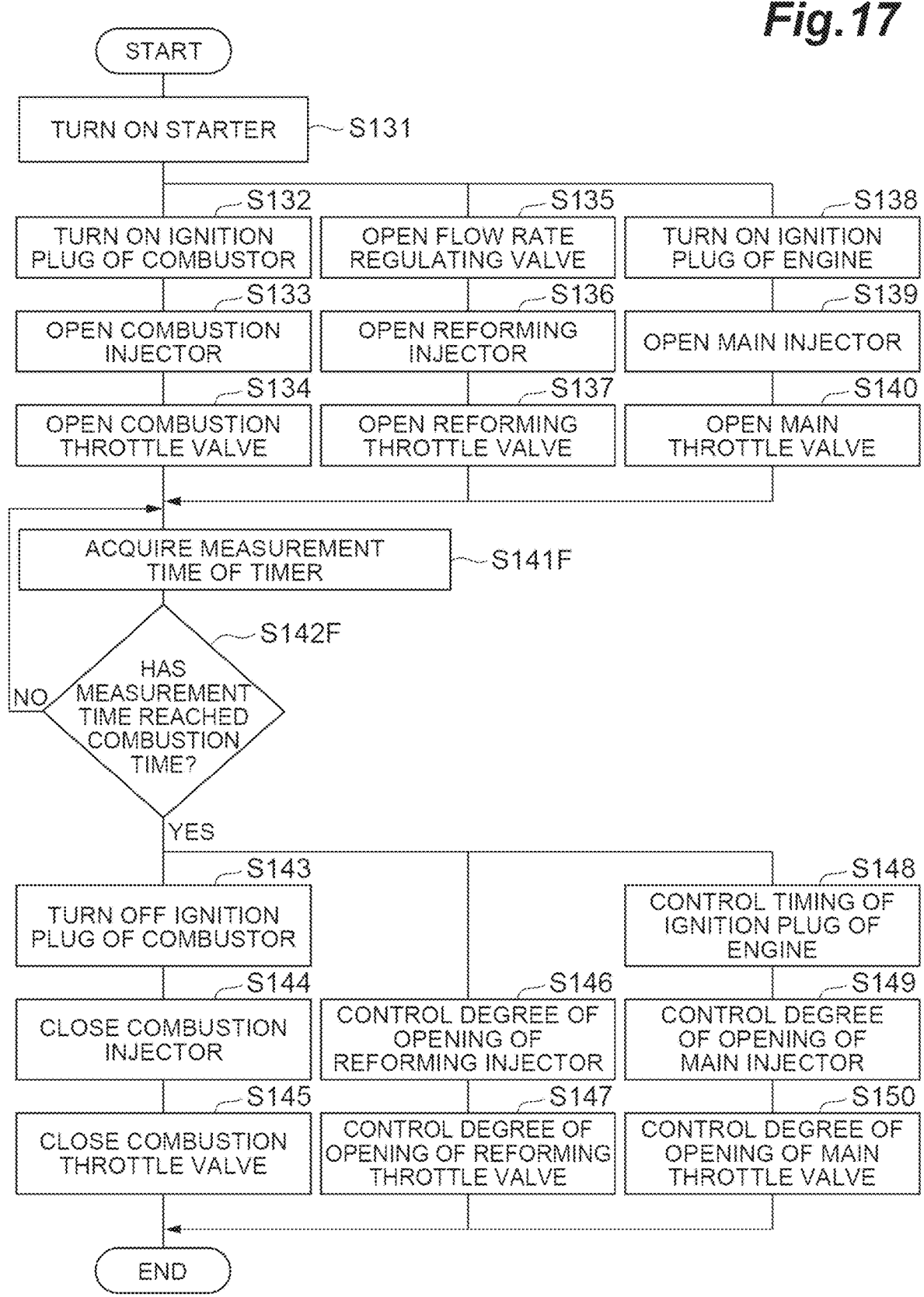
FIG. 17 is a flowchart showing a procedure of start control processing executed by a start control unit shown in FIG. 15.

FIG. 17 is a flowchart showing a procedure of start control processing executed by the start control unit 52F, and corresponds to FIG. 4.

In FIG. 17, after executing steps S131 to S140 above, the start control unit 52F acquires the measurement time of the timer 55 (step S141F). Then, the start control unit 52F determines whether or not the measurement time of the timer 55 from when the starter 45 is controlled to ON has reached the combustion time determined by the combustion time determination unit 51F (step S142F). That is, the start control unit 52F determines whether or not the combustion time determined by the combustion time determination unit 51F has elapsed.

When the start control unit 52F determines that the measurement time of the timer 55 does not reach the combustion time, the start control unit 52F executes step S141F again. When the start control unit 52F determines that the measurement time of the timer 55 has reached the combustion time, the start control unit 52F executes steps S143 to S150 above.

Also in the present embodiment described above, by detecting the operating environment of the combustor 35 in addition to the outside air temperature and the temperature of the reforming catalyst 33, an appropriate period of combustion time according to the operating environment of the combustor 35 is obtained, and therefore an excessive temperature increase and an insufficient temperature increase of the reforming catalyst 33 of the reformer 23 are prevented. Thereby, the temperature of the reforming catalyst 33 of the reformer 23 is increased to an appropriate temperature regardless of the operating environment of the combustor 35.

Further, in the present embodiment, by using the timer 55, it is possible to determine whether it is the timing to stop the combustion operation by the combustor 35 even when the TDC counter 48 is not mounted.

Hereinabove, some embodiments of the present disclosure are described; however, the present disclosure is not limited to the above embodiments. For example, the above first to sixth embodiments may be implemented in combination.

Further, although in the above embodiments the opening control of the combustion injector 38 and the combustion throttle valve 37, the opening control of the reforming injector 26 and the reforming throttle valve 25, and the opening control of the main injector 5 and the main throttle valve 6 are executed in parallel after the starter 45 is turned on, the opening control sequence of these valves is not particularly limited to such a form. For example, in order to reduce the amount of uncombusted ammonia gas in the ammonia engine 2, the opening control of the reforming injector 26 may be executed after the opening control of the combustion injector 38 and the combustion throttle valve 37 is performed.

Further, although the opening degree control of the reforming injector 26 and the reforming throttle valve 25, and the opening degree control of the main injector 5 and the main throttle valve 6, are executed in parallel after the combustion time of the combustor 35 elapses, the opening degree control sequence of these valves is not particularly limited to such a form.

Further, in the above embodiments the ignition plug 40 of the combustor 35 is turned off and the combustion injector 38 and the combustion throttle valve 37 are closed when the combustion time of the combustor 35 elapses, however, depending on the state of the ammonia engine 2, the ignition plug 40 of the combustor 35 may be turned off and the combustion injector 38 and the combustion throttle valve 37 may be closed before the combustion time of the combustor 35 elapses. That is, the operation of combusting ammonia gas by the combustor 35 may be completed no later than when the combustion time of the combustor 35 elapses.

Figure 18:
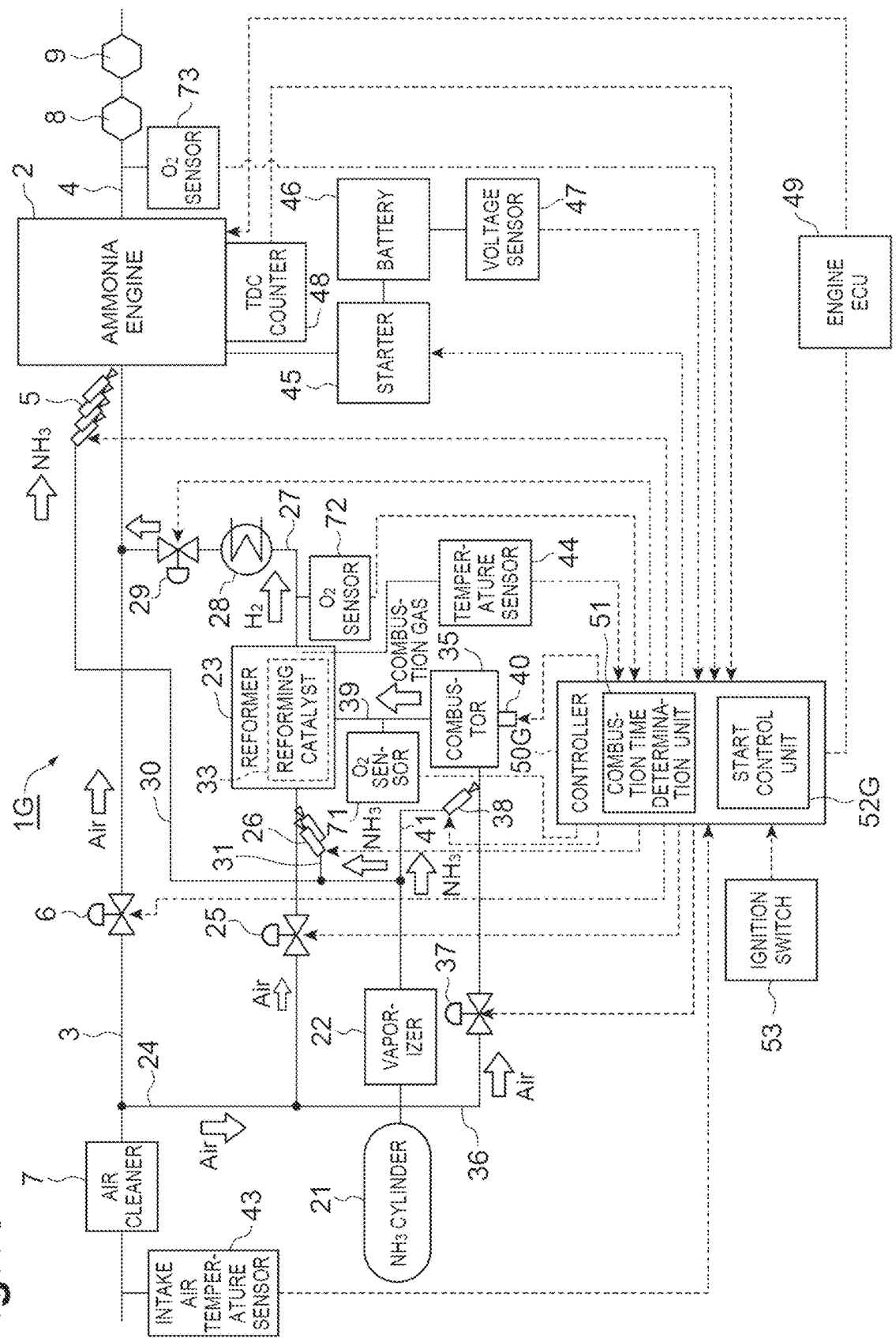
FIG. 18 is a schematic configuration diagram showing a modification example of the engine system shown in FIG. 1.

FIG. 18 is a schematic configuration diagram showing a modification example of the engine system 1 shown in FIG. 1. In FIG. 18, an engine system 1G of the present modification example includes $O_2$ sensors 71 to 73 in addition to the configuration in the above first embodiment.

The $O_2$ sensor 71 is a sensor that detects the concentration of oxygen flowing in the supply pipe 39 on the downstream side of the combustor 35. The $O_2$ sensor 72 is a sensor that detects the concentration of oxygen flowing through the reformed gas flow path 27 on the downstream side of the reformer 23. The $O_2$ sensor 73 is a sensor that detects the concentration of oxygen flowing through the exhaust passage 4 on the downstream side of the ammonia engine 2.

Further, the engine system 1G includes a controller 50G in place of the controller 50 in the above first embodiment. The controller 50G includes the combustion time determination unit 51 described above and a start control unit 52G.

Figure 19:
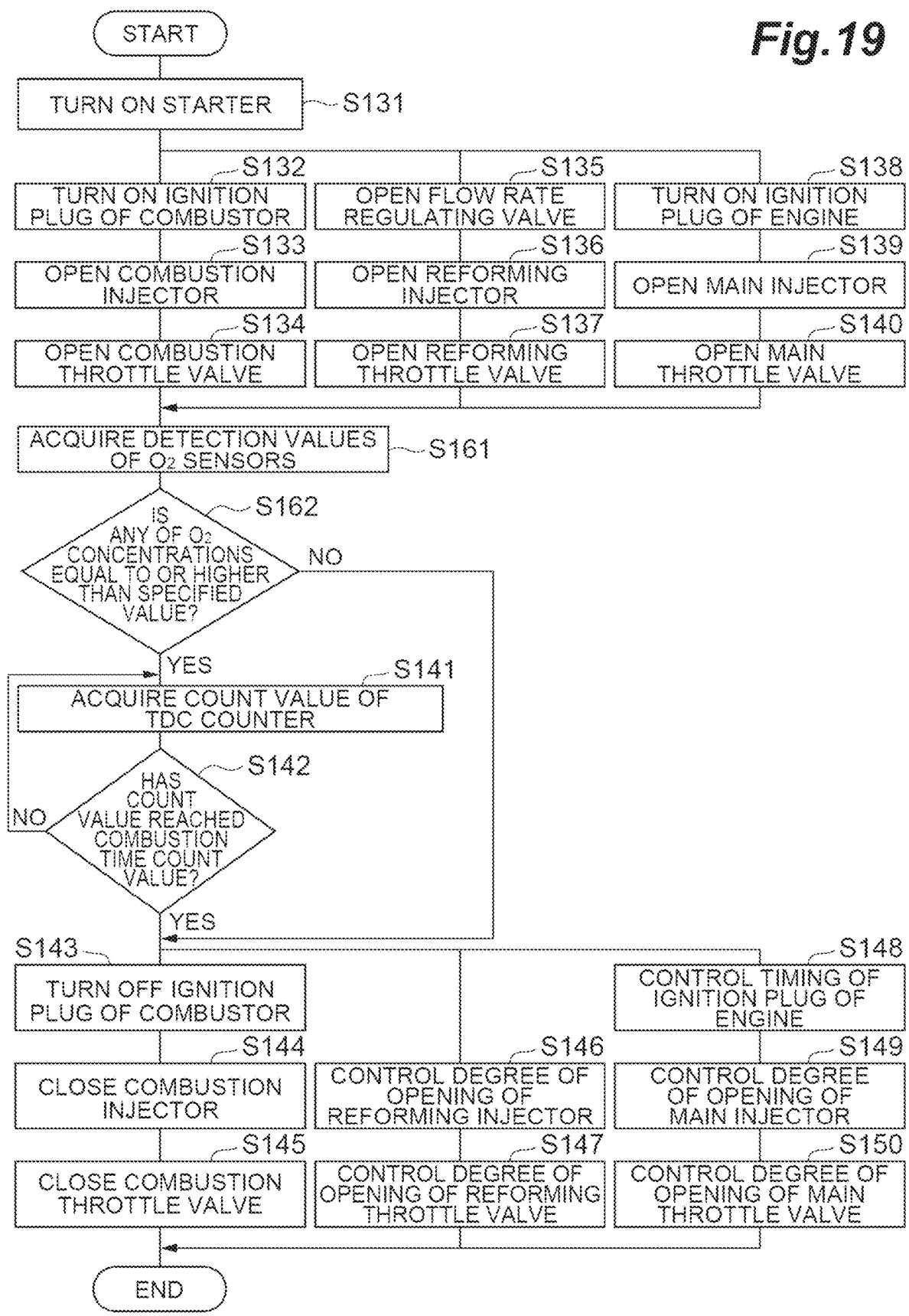
FIG. 19 is a flowchart showing a procedure of start control processing executed by a start control unit shown in FIG. 18.

FIG. 19 is a flowchart showing a procedure of start control processing executed by the start control unit 52G, and corresponds to FIG. 4.

In FIG. 19, after executing steps S131 to S140 above, the start control unit 52G acquires the detection values of the $O_2$ sensors 71 to 73 (step S161). Then, the start control unit 52G determines whether or not any of the concentrations of oxygen flowing through the supply pipe 39, the reformed gas flow path 27, and the exhaust passage 4 is equal to or higher than a specified value (step S162).

When the start control unit 52G determines that any of the concentrations of oxygen flowing through the supply pipe 39, the reformed gas flow path 27, and the exhaust passage 4 is equal to or higher than the specified value, the start control unit 52G executes steps S141 to S150 above. When the start control unit 52G determines that all the concentrations of oxygen flowing through the supply pipe 39, the reformed gas flow path 27, and the exhaust passage 4 are lower than the specified value, the start control unit 52G executes steps S143 to S150 above without executing steps S141 and S142 above.

When the ammonia engine 2 performs combustion normally, the concentrations of oxygen flowing through the supply pipe 39, the reformed gas flow path 27, and the exhaust passage 4 decrease. Thus, the combustion by the combustor 35 may be ended even before the combustion time determined by the combustion time determination unit 51 elapses.

Figure 20:
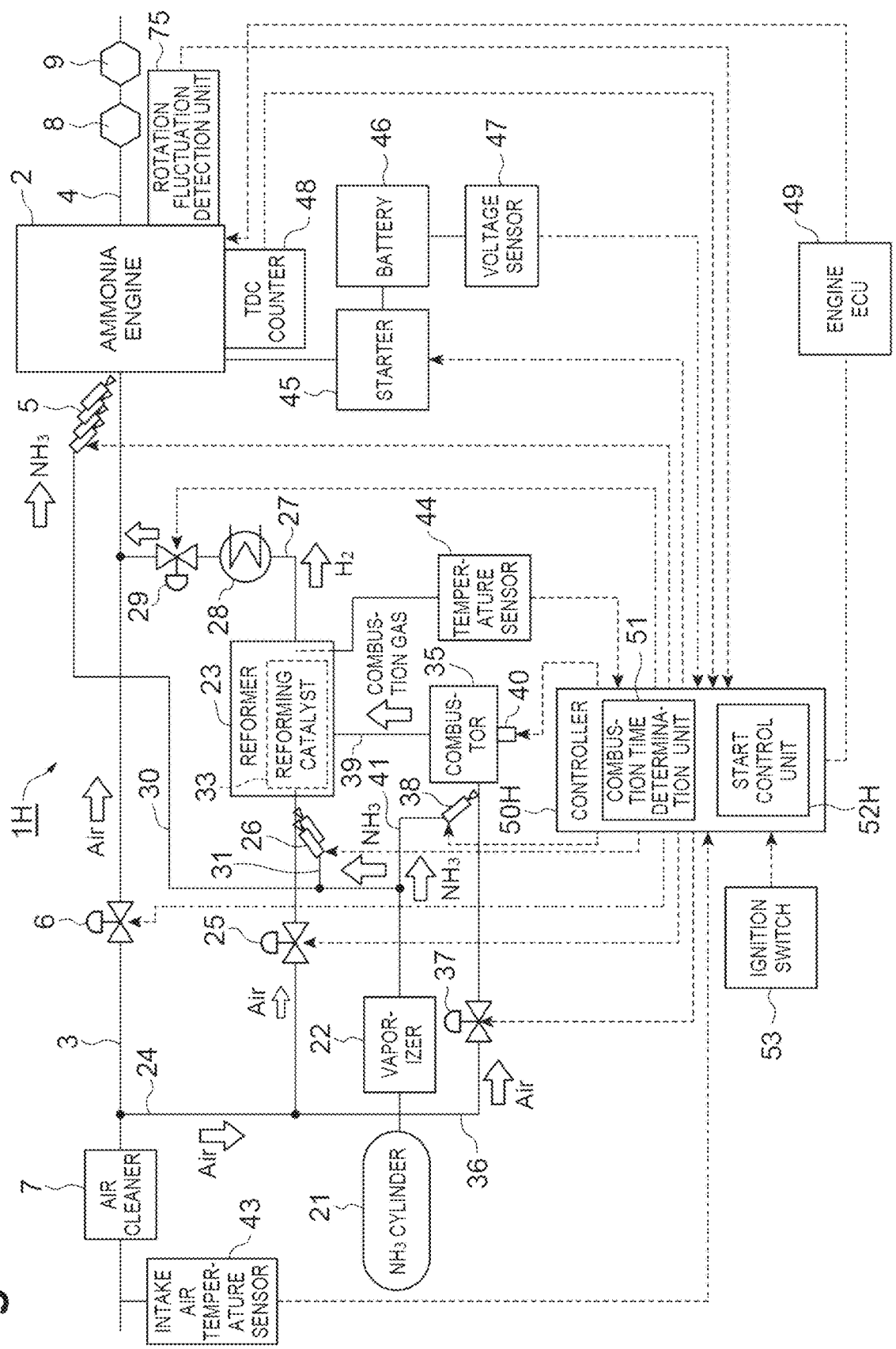
FIG. 20 is a schematic configuration diagram showing another modification example of the engine system shown in FIG. 1.

FIG. 20 is a schematic configuration diagram showing another modification example of the engine system 1 shown in FIG. 1. In FIG. 20, an engine system 1H of the present modification example includes a rotation fluctuation detection unit 75 in addition to the configuration in the above first embodiment. The rotation fluctuation detection unit 75 detects the amount of rotation fluctuation of the ammonia engine 2 by, for example, detecting the amount of fluctuation of the rotation period (rotation frequency) of the crankshaft 13 (see FIG. 2) of the ammonia engine 2.

Further, the engine system 1H includes a controller 50H in place of the controller 50 in the above first embodiment. The controller 50H includes the combustion time determination unit 51 described above and a start control unit 52H.

Figure 21:
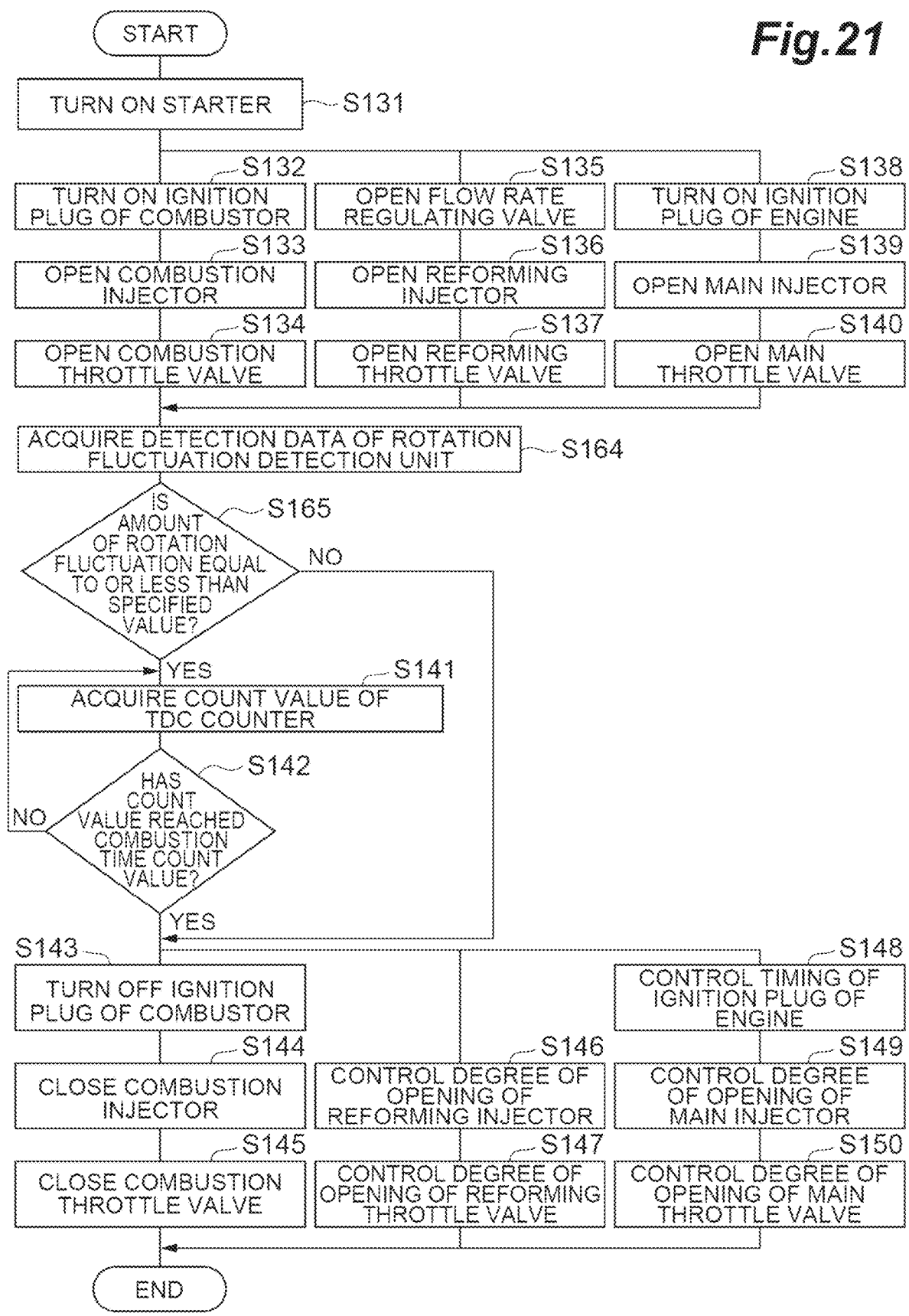
FIG. 21 is a flowchart showing a procedure of start control processing executed by a start control unit shown in FIG. 20.

FIG. 21 is a flowchart showing a procedure of start control processing executed by the start control unit 52H, and corresponds to FIG. 4.

In FIG. 21, after executing steps S131 to S140 above, the start control unit 52H acquires detection data of the rotation fluctuation detection unit 75 (step S164). Then, the start control unit 52H determines whether or not the amount of rotation fluctuation of the ammonia engine 2 is equal to or less than a specified value (step S165).

When the start control unit 52H determines that the amount of rotation fluctuation of the ammonia engine 2 is equal to or less than the specified value, the start control unit 52H executes steps S141 to S150 above. When the start control unit 52H determines that the amount of rotation fluctuation of the ammonia engine 2 is greater than the specified value, the start control unit 52H executes steps S143 to S150 above without executing steps S141 and S142 above.

When the ammonia engine 2 performs combustion normally, the rotation frequency of the crankshaft 13 increases, and accordingly the amount of rotation fluctuation of the ammonia engine 2 increases. Thus, the combustion by the combustor 35 may be ended even before the combustion time determined by the combustion time determination unit 51 elapses.

Figure 22:
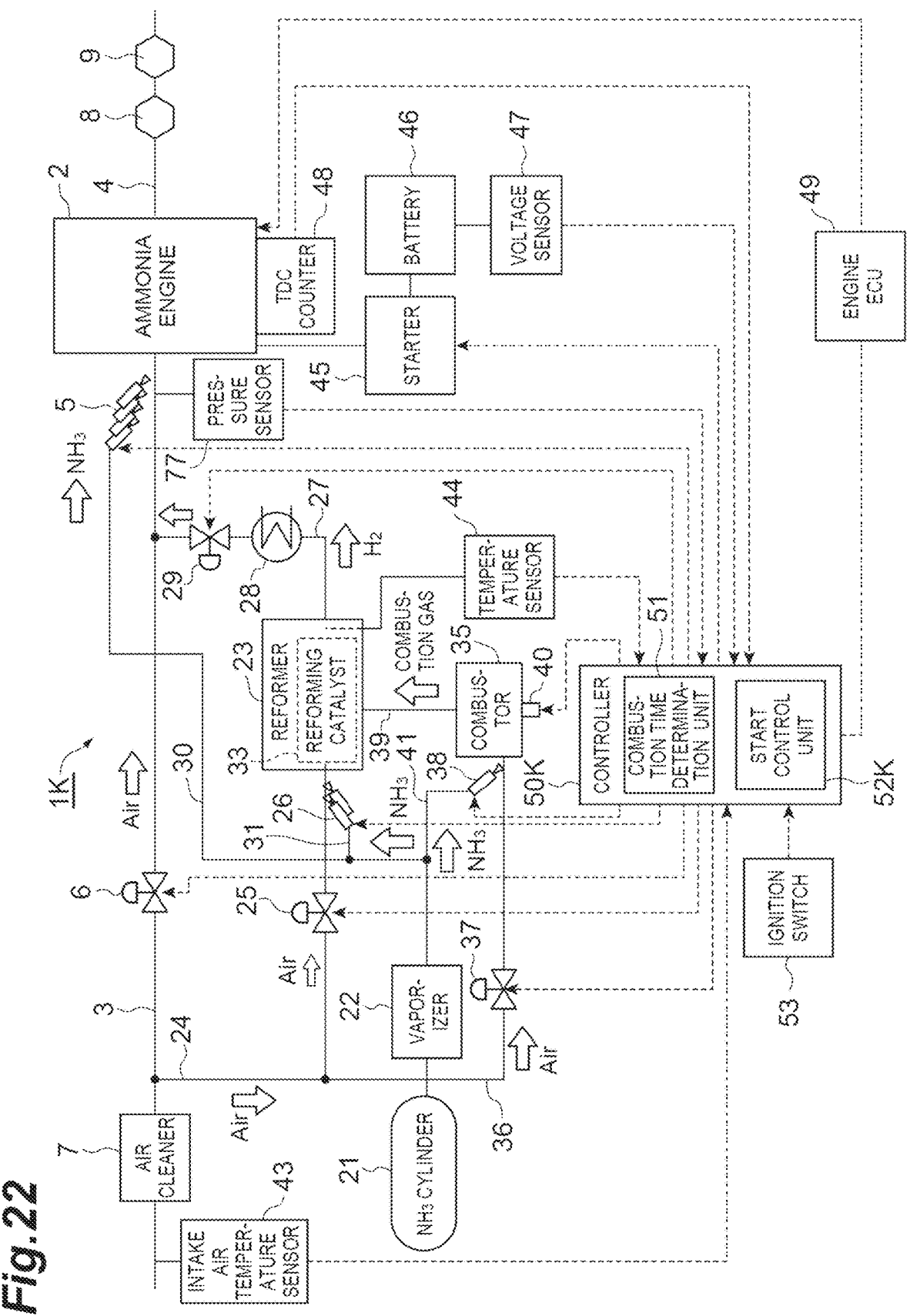
FIG. 22 is a schematic configuration diagram showing still another modification example of the engine system shown in FIG. 1.

FIG. 22 is a schematic configuration diagram showing still another modification example of the engine system 1 shown in FIG. 1. In FIG. 22, an engine system 1K of the present modification example includes a pressure sensor 77 in addition to the configuration in the above first embodiment. The pressure sensor 77 is a sensor that detects pressure (intake air pressure) on the upstream side of the ammonia engine 2. Specifically, the pressure sensor 77 detects the pressure of a portion of the intake passage 3 between the main throttle valve 6 and the ammonia engine 2.

Further, the engine system 1K includes a controller 50K in place of the controller 50 in the above first embodiment. The controller 50K includes the combustion time determination unit 51 described above and a start control unit 52K.

Figure 23:
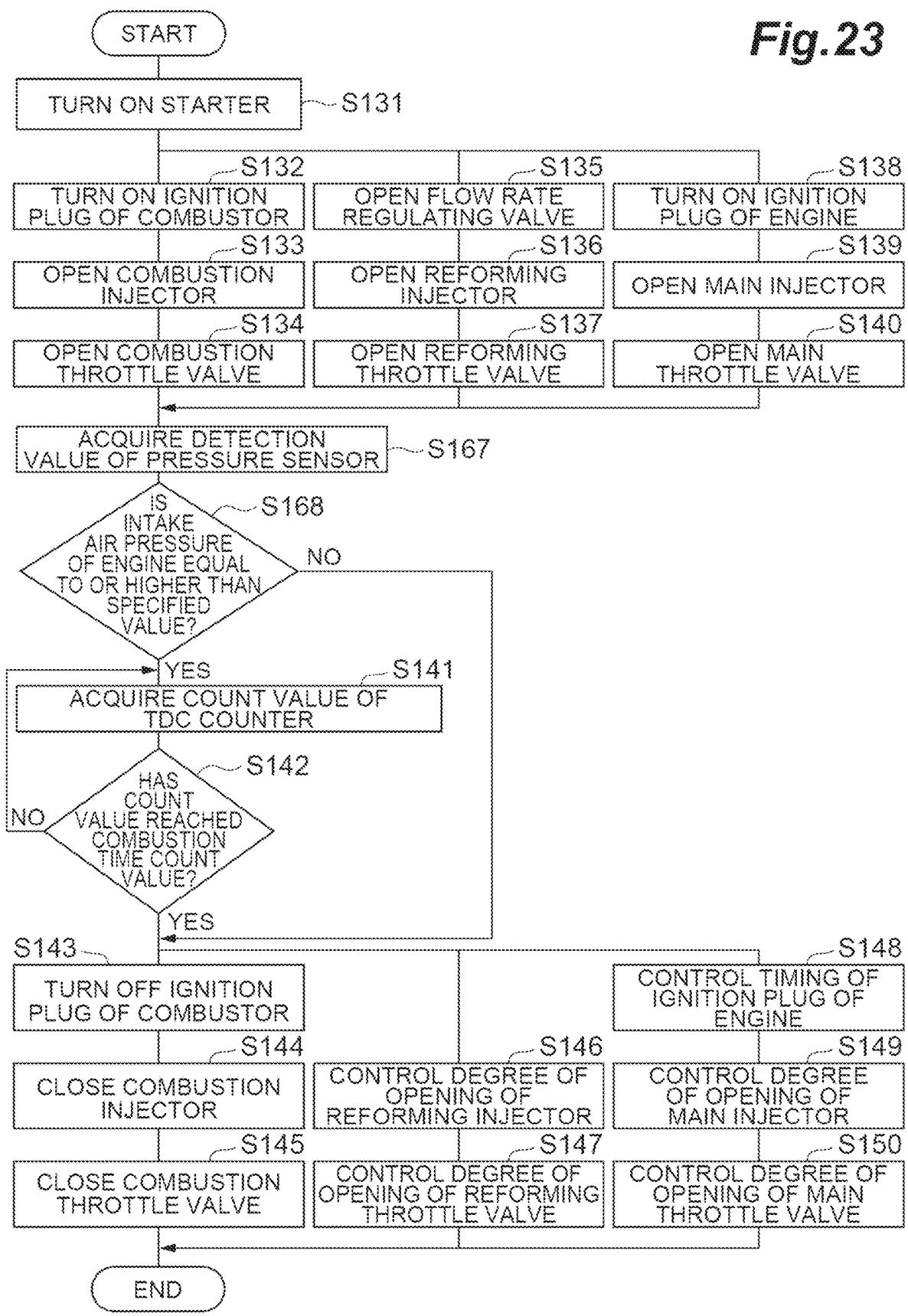
FIG. 23 is a flowchart showing a procedure of start control processing executed by a start control unit shown in FIG. 22.

FIG. 23 is a flowchart showing a procedure of start control processing executed by the start control unit 52K, and corresponds to FIG. 4.

In FIG. 23, after executing steps S131 to S140 above, the start control unit 52K acquires the detection value of the pressure sensor 77 (step S167). Then, the start control unit 52K determines whether or not the intake air pressure of the ammonia engine 2 is equal to or higher than a specified value (step S168).

When the start control unit 52K determines that the intake air pressure of the ammonia engine 2 is equal to or higher than the specified value, the start control unit 52K executes steps S141 to S150 above. When the start control unit 52K determines that the intake air pressure of the ammonia engine 2 is lower than the specified value, the start control unit 52K executes steps S143 to S150 above without executing steps S141 and S142 above.

When the ammonia engine 2 performs combustion normally, the rotation frequency of the crankshaft 13 increases, and accordingly the negative pressure in the ammonia engine 2 increases. Thus, the combustion by the combustor 35 may be ended even before the combustion time determined by the combustion time determination unit 51 elapses.

Although in the above embodiments the combustion throttle valve 37 is provided, the combustion throttle valve 37 may not be necessarily provided when the use time of the combustion throttle valve 37 is short.

Further, although in the above embodiments the current temperature of the reforming catalyst 33 is detected by detecting the temperature of any place of the reformer 23 with the temperature sensor 44, the configuration is not necessarily limited to such a configuration. For example, the temperature of the reforming catalyst 33 at the time of stopping of the operation of the vehicle may be detected by the temperature sensor 44, and the temperature of the reforming catalyst 33 at the time of restarting the ammonia engine 2 may be determined using the temperature of the reforming catalyst 33 at the time of stopping of the operation and the period of time from the stopping to the restarting of the ammonia engine 2.

Further, although in the above embodiments the reformer 23 includes a reforming catalyst 33 having both the function of combusting ammonia gas and the function of decomposing ammonia gas into hydrogen, the configuration is not necessarily limited to such a configuration. The reformer 23 may separately include a combustion catalyst for combusting ammonia gas and a reforming catalyst for decomposing ammonia gas into hydrogen.

Further, although ammonia gas is used as fuel in the above embodiments, the present disclosure is also applicable to an engine system that uses hydrocarbons or the like as fuel.

REFERENCE SIGNS LIST 1, 1A, 1B, 1C, 1D, 1E, 1F, 1G, 1H, 1K engine system
2 ammonia engine (engine)
3 intake passage
4 exhaust passage
5 main injector (first fuel supply valve)
6 main throttle valve (first flow rate control valve)
23 reformer
24 air flow path (first air flow path)
25 reforming throttle valve (second flow rate control valve)
26 reforming injector (second fuel supply valve)
27 reformed gas flow path
33 reforming catalyst (catalyst)
35 combustor
36 air flow path (second air flow path)
38 combustion injector (third fuel supply valve)
40 ignition plug (ignition unit)
43 intake air temperature sensor (outside air temperature detection unit)
44 temperature sensor (catalyst temperature detection unit)
45 starter
46 battery
47 voltage sensor (operating environment detection unit)
51, 51A, 51B, 51C, 51D, 51E, 51F combustion time determination unit
52, 52F, 52G, 52H, 52K start control unit
61 temperature sensor (operating environment detection unit)
63 pressure sensor (operating environment detection unit)
65 intake air pressure sensor (operating environment detection unit)
67 water temperature sensor (operating environment detection unit)
69 oil temperature sensor (operating environment detection unit)
x reference TDC count value (reference period of time)
C1 addition count value (first period of time)
C2 addition count value (second period of time)
C3 addition count value (third period of time)
to reference period of time
t1 addition period of time (first period of time)
t2 addition period of time (second period of time)
t3 addition period of time (third period of time)

The invention claimed is:

1. An engine system comprising:
an engine in which fuel gas combusts together with hydrogen;
a starter configured to start the engine;
an intake passage through which air supplied to the engine flows;
an exhaust passage through which exhaust gas generated in the engine flows;

a first flow rate control valve provided on the intake passage and configured to control a flow rate of air supplied to the engine;

a first fuel supply valve configured to supply the fuel gas to the engine;

a reformer including a catalyst that decomposes the fuel gas into hydrogen and configured to reform the fuel gas to generate a reformed gas containing the hydrogen;

a first air flow path through which air supplied to the reformer flows;

a second flow rate control valve provided on the first air flow path and configure to control a flow rate of air supplied to the reformer;

a second fuel supply valve configured to supply the fuel gas to the reformer;

a reformed gas flow path through which the reformed gas generated by the reformer flows toward the engine;

a combustor including an ignition unit and configured to generate combustion gas that heats the catalyst, the ignition unit being configured to ignite the fuel gas;

a second air flow path through which air supplied to the combustor flows;

a third fuel supply valve configured to supply the fuel gas to the combustor;

an outside air temperature detection unit configured to detect an outside air temperature;

a catalyst temperature detection unit configured to detect a temperature of the catalyst;

an operating environment detection unit configured to detect an operating environment of the combustor;

a combustion time determination unit configured to determine combustion time of the combustor based on the outside air temperature detected by the outside air temperature detection unit, the temperature of the catalyst detected by the catalyst temperature detection unit, and the operating environment of the combustor detected by the operating environment detection unit; and a start control unit configured to, at a time of starting the engine, perform ON control on the starter and the ignition unit and control the first fuel supply valve, the second fuel supply valve, the third fuel supply valve, the first flow rate control valve, and the second flow rate control valve to open, and thereafter when the combustion time determined by the combustion time determination unit elapses, perform OFF control on the ignition unit and control the third fuel supply valve to close.

2. The engine system according to claim 1, wherein the combustion time determination unit determines the combustion time by setting a first period of time according to the outside air temperature, a second period of time according to the temperature of the catalyst, and a third period of time according to the operating environment of the combustor, and by adding the first period of time, the second period of time, and the third period of time to a reference period of time determined in advance.

3. The engine system according to claim 1, wherein the operating environment of the combustor is a quantity of state regarding a concentration of oxygen contained in the air or a flow rate of at least one of the fuel gas and the air supplied to the combustor.

4. The engine system according to claim 3, further comprising
a battery configured to supply power to the starter,
wherein the operating environment detection unit detects a voltage of the battery as a quantity of state regarding the concentration of oxygen contained in the air or the flow rate of at least one of the fuel gas and the air supplied to the combustor.

5. The engine system according to claim 3, further comprising
a vaporizer configured to vaporize liquid fuel to generate the fuel gas,
wherein the operating environment detection unit detects a temperature of the vaporizer or a pressure of the fuel gas generated by the vaporizer as a quantity of state regarding the concentration of oxygen contained in the air or the flow rate of at least one of the fuel gas and the air supplied to the combustor.

6. The engine system according to claim 3, wherein the operating environment detection unit detects a pressure of the air flowing through the second air flow path as a quantity of state regarding the concentration of oxygen contained in the air or the flow rate of at least one of the fuel gas and the air supplied to the combustor.

7. The engine system according to claim 1, wherein the operating environment of the combustor is a quantity of state regarding an amount of the hydrogen generated, the amount being required of the reformer.

8. The engine system according to claim 7, wherein the operating environment detection unit detects a temperature of cooling water for cooling the engine or a temperature of engine oil in the engine as a quantity of state regarding the amount of the hydrogen generated, the amount being required of the reformer.

* * * * *